US011964832B2

(12) United States Patent
Hogan et al.

(10) Patent No.: US 11,964,832 B2
(45) Date of Patent: Apr. 23, 2024

(54) SYSTEM AND METHOD FOR MOVING ELEMENT TRANSPORT IN A CONVEYOR SYSTEM

(71) Applicant: ATS CORPORATION, Cambridge (CA)

(72) Inventors: Roger Hogan, Cambridge (CA); Albert Kleinikkink, Cambridge (CA); Blake Robert Lambert, Cambridge (CA)

(73) Assignee: ATS CORPORATION, Cambridge (CA)

( * ) Notice: Subject to any disclaimer, the term of this patent is extended or adjusted under 35 U.S.C. 154(b) by 0 days.

(21) Appl. No.: 17/681,030

(22) Filed: Feb. 25, 2022

(65) Prior Publication Data

US 2022/0274791 A1    Sep. 1, 2022

Related U.S. Application Data

(60) Provisional application No. 63/154,393, filed on Feb. 26, 2021.

(51) Int. Cl.
*B65G 54/02* (2006.01)
*B65G 43/00* (2006.01)
*H02K 41/02* (2006.01)

(52) U.S. Cl.
CPC ............. *B65G 54/02* (2013.01); *B65G 43/00* (2013.01); *H02K 41/02* (2013.01); *B65G 2203/0266* (2013.01)

(58) Field of Classification Search
CPC ...... B65G 54/02; B65G 47/766; B65G 43/00; B65G 2203/0266; H02K 41/02

(Continued)

(56) References Cited

U.S. PATENT DOCUMENTS 5,156,093 A * 10/1992 Azukizawa ............ B65G 54/02
  104/282
6,308,818 B1 * 10/2001 Bonora ................... B65G 35/06
  198/465.1

(Continued)

FOREIGN PATENT DOCUMENTS

DE    102019117351 A1    12/2020
GB        1247257    *   9/1971    ............. B65G 54/02

(Continued)

OTHER PUBLICATIONS

Extended European Search Report, European Patent Office, corresponding EP Patent Application No. 22158994.8, dated Aug. 8, 2022.

*Primary Examiner* — James R Bidwell
(74) *Attorney, Agent, or Firm* — Amarok IP Inc.; Neil W. Henderson

(57) ABSTRACT

A transporting system and method for a linear motor conveyor system, wherein the conveyor system includes at least one moving element and at least one track on which the moving element moves, the transporting system including: a rotatable element; a motor for rotating the rotatable element; a coupler connected to the rotatable element, wherein the coupler is configured to engage with the moving element when the coupler is positioned in a predetermined relationship with the moving element; and a controller configured to: operatively connect with the linear motor conveyor system; and control at least one of the moving element and the rotatable element so that the coupler is positioned in the predetermined relationship with the moving element on the track such that the coupler strips the moving element off the track.

12 Claims, 30 Drawing Sheets

(58) Field of Classification Search
USPC .......................................................... 198/805
See application file for complete search history.

(56) References Cited

U.S. PATENT DOCUMENTS

| | | | |
|---|---|---|---|
| 6,907,983 B2* | 6/2005 | Freudelsperger | B65G 47/80 198/463.3 |
| 8,919,532 B2* | 12/2014 | Buergermeister | B61B 5/00 198/465.1 |
| 9,284,127 B2 | 3/2016 | Heinsohn et al. | |
| 11,505,410 B2 | 11/2022 | Papsdorf et al. | |
| 2019/0002214 A1* | 1/2019 | Weber | H02P 6/006 |
| 2019/0077277 A1* | 3/2019 | Holzleitner | B60L 13/03 |
| 2019/0389019 A1 | 12/2019 | Sticht et al. | |
| 2022/0242675 A1* | 8/2022 | Hogan | B65G 35/06 |

FOREIGN PATENT DOCUMENTS

| | | | | |
|---|---|---|---|---|
| JP | 406024561 | | 1/1994 | |
| JP | 6621205 B2 | | 12/2019 | |
| WO | 2018/161160 | * | 9/2018 | ............ B65G 54/02 |
| WO | 2020127524 A1 | | 6/2020 | |

* cited by examiner

SYSTEM AND METHOD FOR MOVING ELEMENT TRANSPORT IN A CONVEYOR SYSTEM

FIELD

The present disclosure relates generally to a system and method for moving element transport in a conveyor system and, more particularly, to a system and a method for removing and placing a moving element on a conveyor system.

BACKGROUND

In conventional conveyor systems, generally speaking a moving element (or pallet) is controlled to move along a track, typically via bearings that are provided on the moving element or on the track or both and may include rails or the like for guiding the moving element. In order to make a conveyor system easier to construct, the track is often formed in sections/modules and the sections are then attached together to form a longer track.

Conventional conveyor systems may be constrained where there are curvilinear or curved sections of track for various reasons. For example, as the radius of a curved track section is smaller towards the interior of the curve than the exterior of the curve, conventional conveyor systems may encounter problems with the arrangement and configuration of moving elements as they travel through curved track sections as the moving element will have a predetermined shape that may not be able to adapt to the shape of the curved track section. In this case, the curved track section may need to have a larger radius than might be desired.

A particular type of conveyor, generally referred to as a linear motor conveyor system, makes use of magnetic fields to move moving elements along a track and can present additional issues in working with a curved track section due to the nature of the magnetic drive mechanism, which can be more difficult to arrange in a curved format. Due to this issue, conventional linear motor conveyor systems may need to have larger curved track sections, limit the configurations available, avoid curved track sections generally, or the like. Further, conventional linear motor conveyor systems may also have difficulty tracking moving elements through a curved track section and/or during transition to straight track sections.

In some cases, a moving element may be mounted vertically on a vertically arranged track (vertical linear motor conveyor). In this situation, an outside curve, i.e. a curve on which the moving element moves around the outside of the curve, can generally be made due to the wider radius of curvature but an inside curve, i.e. a curve on which the moving element moves around the inside of the curve, can be more difficult due to the smaller radius of curvature.

Linear motor conveyors have a further issue in that the moving element is typically held on the track via the same magnetic forces that are used to drive the moving element along the track. This is particularly true in vertical linear motor conveyors where magnetic forces generally assist in holding the moving element on the track. In this case, it can be difficult to remove (strip) the moving element off of the track, even when any railings or other support for the moving element are moved away or the like.

As such, there is a need for an improved system and method for transporting a moving element on a linear motor conveyor track and/or moving a moving element around an inside curve on a vertical linear motor conveyor.

SUMMARY

According to one aspect herein, there is provided a transporting system for a linear motor conveyor system, wherein the conveyor system includes at least one moving element and at least one track on which the moving element moves, the transporting system including: a rotatable element; a motor for rotating the rotatable element; a coupler connected to the rotatable element, wherein the coupler is configured to engage with the moving element when the coupler is positioned in a predetermined relationship with the moving element; and a controller configured to: operatively connect with the linear motor conveyor system; and control at least one of the moving element and the rotatable element so that the coupler is positioned in the predetermined relationship with the moving element on the track such that the coupler removes/strips the moving element off the track.

In some cases, the at least one track of the linear motor conveyor system may include a first track and a second track that is different from the first track and the controller may be further configured to, after removing the moving element from the first track, move the coupler such that the moving element is placed on the second track and disengage the coupler to release the moving element onto the second track.

In some cases, the coupler may be configured to engage with the moving element and to disengage/release the moving element by a cam system in communication with the coupler. In these cases, the cam system may also be configured to push the moving element off the coupler in order to release the moving element.

In some cases, the coupler may be configured to engage with the moving element by a magnetic coupling system.

In some cases, the motor may be a servo motor.

In some cases, the system may include a plurality of couplers and the plurality of couplers may be spaced such that, as the rotating element rotates, the moving element may pass between couplers while moving on the track.

According to another aspect herein, there is provided a transporting system for a linear motor conveyor system, wherein the conveyor system includes at least one moving element and a first track and a second track that is different from the first track on which the moving element moves, the transporting system include: a rotatable element; a motor for rotating the rotatable element; a coupler connected to the rotatable element, wherein the coupler includes a coupler head configured to engage with the moving element when the coupler is positioned in a predetermined relationship with the moving element; and a controller configured to: operatively connect with the linear motor conveyor system; control at least one of the moving element and the rotatable element so that the coupler is positioned in the predetermined relationship with the moving element on the first track such that the coupler removes/strips the moving element off the first track; and control at least one of the rotatable element and the second track to place the moving element on the second track and disengage the coupler head to release the moving element onto the second track.

In some cases, the system may further include a cam system that adjusts the coupler head to assist the coupler head to engage with the moving element and to release the moving element. For example, by adjusting the orientation of the coupler head. In some cases, the cam system and coupler may include, for example, a roller that can be moved to push the moving element off of the coupler head.

In some cases, the coupler may be configured to engage with the moving element by a magnetic coupling system.

In some cases, the motor may be a servo motor.

In some cases, the system may include a plurality of couplers and the plurality of couplers are spaced such that, as the rotating element rotates, the moving element may pass between couplers while moving on the track.

According to another aspect herein, there is provided a transporting method for a linear motor conveyor system, wherein the conveyor system includes at least, one moving element and a first track and a second track that is different from the first track on which the moving element moves, the transporting method including: moving a coupler to match with the moving element on the first track; engaging the coupler with the moving element; stripping the moving element off the first track; moving the coupler and moving element to a second track; placing the moving element on the second track; and releasing the moving element from the coupler.

In some cases, the engaging may include bringing a magnet in proximity to the moving element and the stripping may include prying the moving element off the first track via the magnetic force. In these cases, the releasing may include pushing the moving element off of the magnet.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides for a diverter for a conveyor system. As moving elements travel along a conveyor, there are generally one or more straight track sections followed by or connected by one or more curved track sections. The curved track section may be a transition between straight track sections, a transition to a straight track section at a different angle, or the like and, in some cases, may allow the moving element to travel to a different track or continue on the same path. The present disclosure provides for a transfer system or apparatus between straight sections, which may include additional support for the moving element during the transition. This additional support is intended to provide for a smoother transition or transfer between straight track sections that may not be aligned and also provide for an agnostic solution as the moving element may transition between differently driven conveyor track sections. Generally, it is intended that straight track sections (sometimes referred to as track segments) of a conveyor may be driven by electromagnetic motor drive, servo motor drive or the like.

Conventional conveyor systems tend to be constructed through a combination of straight and curved track sections. Conventionally, a single drive system may be used to drive all sections in a given conveyor system and drive all the moving elements on the conveyor in the same path. Generally, an electromagnetic drive tends to be costly and the kinematics of a curved section for an electromagnetic drive may require a minimum radius that impacts the overall footprint of the conveyor system. Further, as the moving element tends to travel along an outside radius in at least some electromagnetic drive conveyor system, the moving element tends to travel in a predetermined path and turn in a single direction, providing limited options available for a given path of a moving element.

As users of conveyor systems may want to transfer or move some or all of a plurality of moving elements on a conveyor system around a corner or the like to a different conveyor system or a different path of the conveyor system, there is a need for a transfer system that provides flexibility.

In the following description, the examples relate to a linear motor conveyor system (for at least the straight sections) but the same or similar joint connector and method can generally be used with other conveyor systems or hybrid conveyor systems that may benefit from an improved transfer between track sections or around a curve in a conveyor system.

Figure 1:
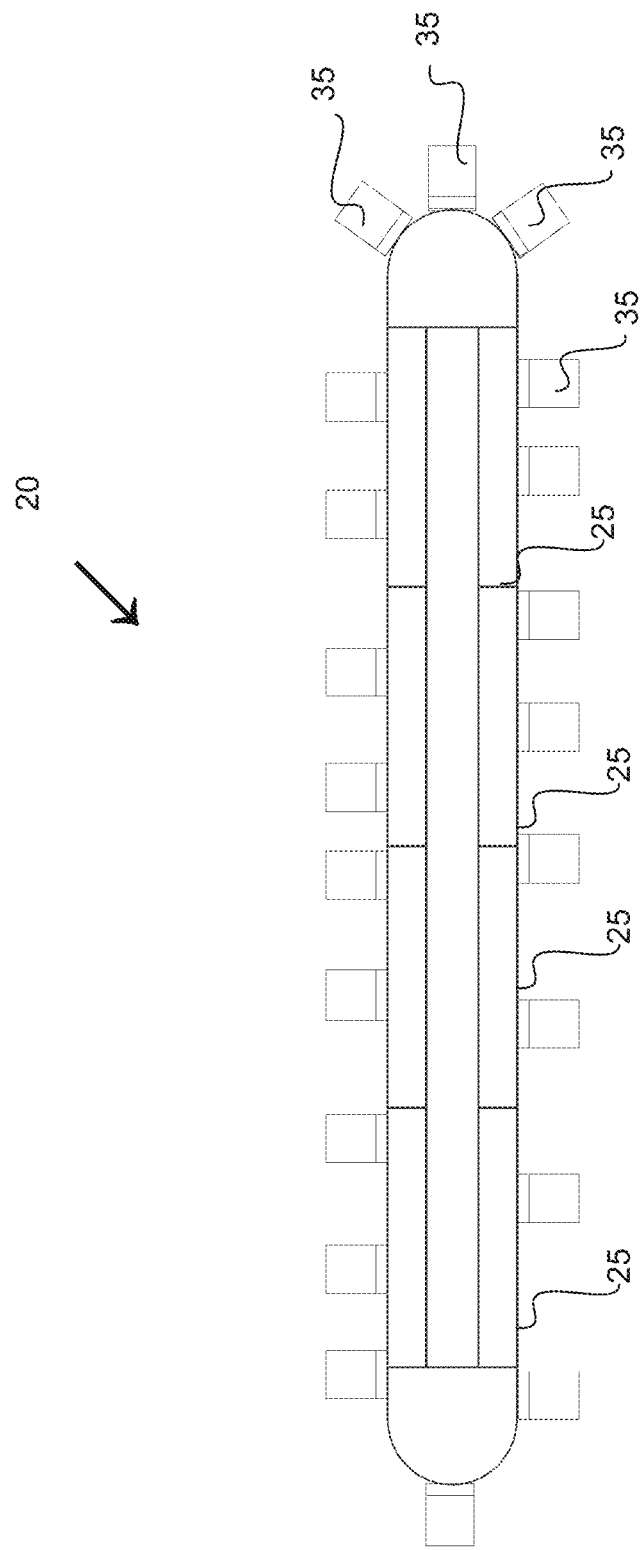
FIG. 1 shows a schematic drawing of an embodiment of a conveyor system that includes moving elements and a track, made up of track sections.

FIG. 1 shows a schematic diagram of an example conveyor system 20. The conveyor system 20 includes one or more track sections 25, 26 defining a track. In FIG. 1, a plurality of straight track sections 25 are provided with two curved sections 26. A plurality of moving elements 35 are provided to the track and move around on the conveyor system 20. In a manufacturing environment, the moving elements 35 are intended to travel between workstations (not shown) and may support a pallet or product (not shown) that is to be operated on automatically by, for example, a robot, while moving or at a workstation or may travel to a workstation or other work area intended for manual operations. Through the operation of the conveyor system 20, various operations are performed to provide for the assembly of a product. In this disclosure, the terms "moving element" and "pallet" may sometimes be used interchangeably, depending on the context.

Figure 2:
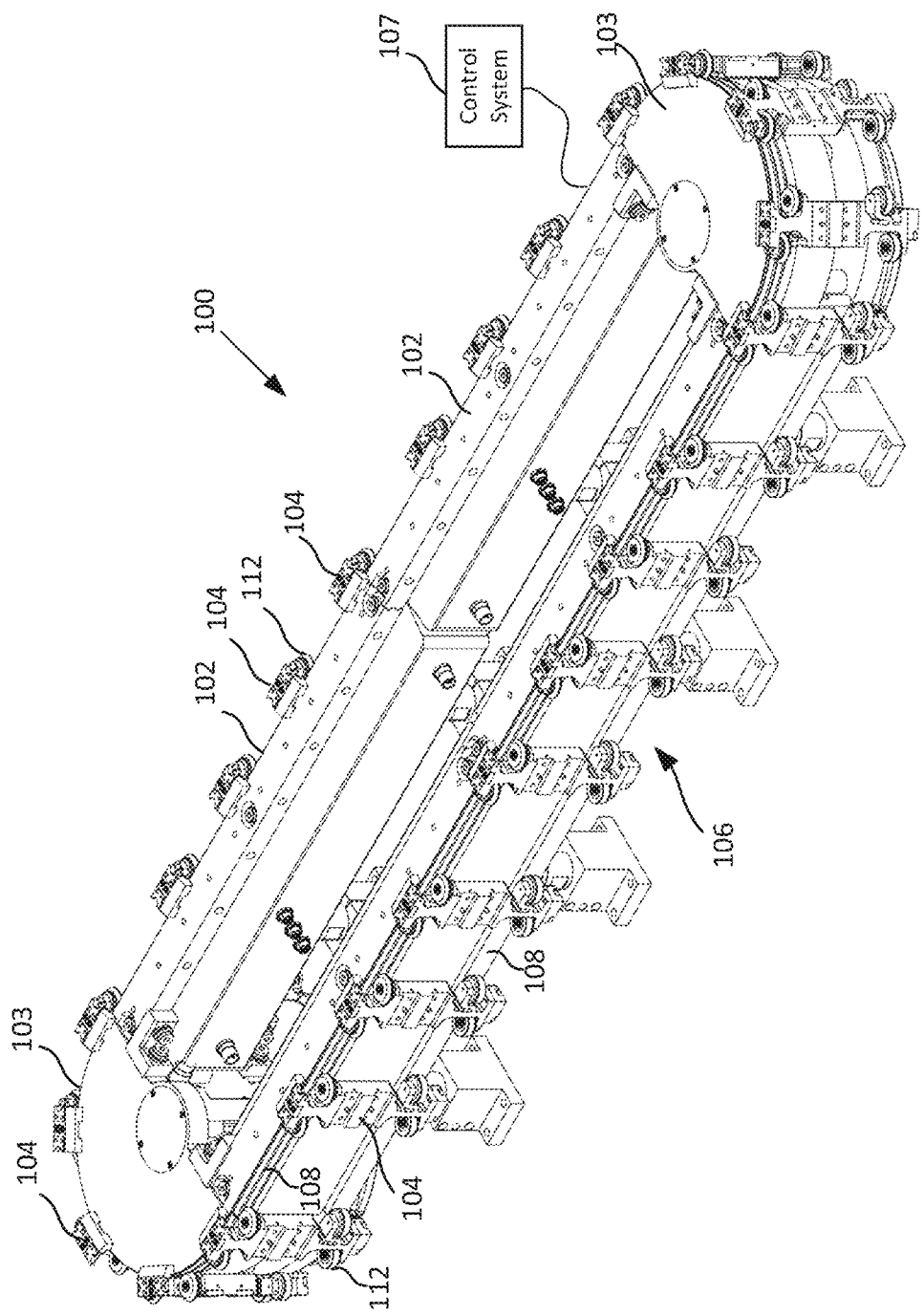
FIG. 2 shows a perspective view of an embodiment of a conveyor system that includes moving elements and a track, made up of track sections.

FIG. 2 illustrates a perspective view of another example linear motor conveyor system 100 having one or more track sections 102, 103 defining a track 106, and one or more moving elements 104 which are configured to ride, move or travel along the track 106. In FIG. 2, there are four straight track sections 102, and two corner track sections 103, and a plurality of moving elements 104. However, it will be understood that the modular nature of the track sections allow for various sizes and shapes of conveyors and any appropriate number of moving elements. In FIGS. 1 and 2, the corner (or curved) track sections 103 are 180 degree turns but in some configurations the curved track sections 103 may have different angles such as 45, 90, 135 degree angles or the like. Some of the principles of operation of a similar track section are described in more detail in, for example, U.S. Pat. No. 8,397,896 to Kleinikkink et al., which is hereby incorporated herein by reference.

As noted, the conveyor system 100 may include a plurality of track sections 102, 103, which are mechanically self-contained and separable from one another so as to be modular in nature. In order to be modular, each track section 102, 103 may house electronic circuitry and/or mechanical parts for powering and controlling the related track section 102, 103 and/or there may be a controller/control system 107 that controls the related track section or the track 106 overall (only one controller is shown but other controllers for track sections may be included as well). In some cases the track controller may communicate or interface with track section controllers provided for each of the track sections 102, 103. The controller(s) may include a processor that executes a program stored on a machine readable medium. The machine readable medium may be a part of the controller or at a remote location or the like.

In a linear motor conveyor system 100, the track 106 may produce a magnetic force for moving the moving element 104 along the track 106. The magnetic force can also capture, support or hold the moving element 104 on the track 106. The magnetic force is at least partly generated by the interaction of the magnetic flux created by embedded coils of the track 106 and magnetic elements of the moving element 104. It will be understood that conveyor systems with different motor drives may be driven in other manners.

Figure 3:
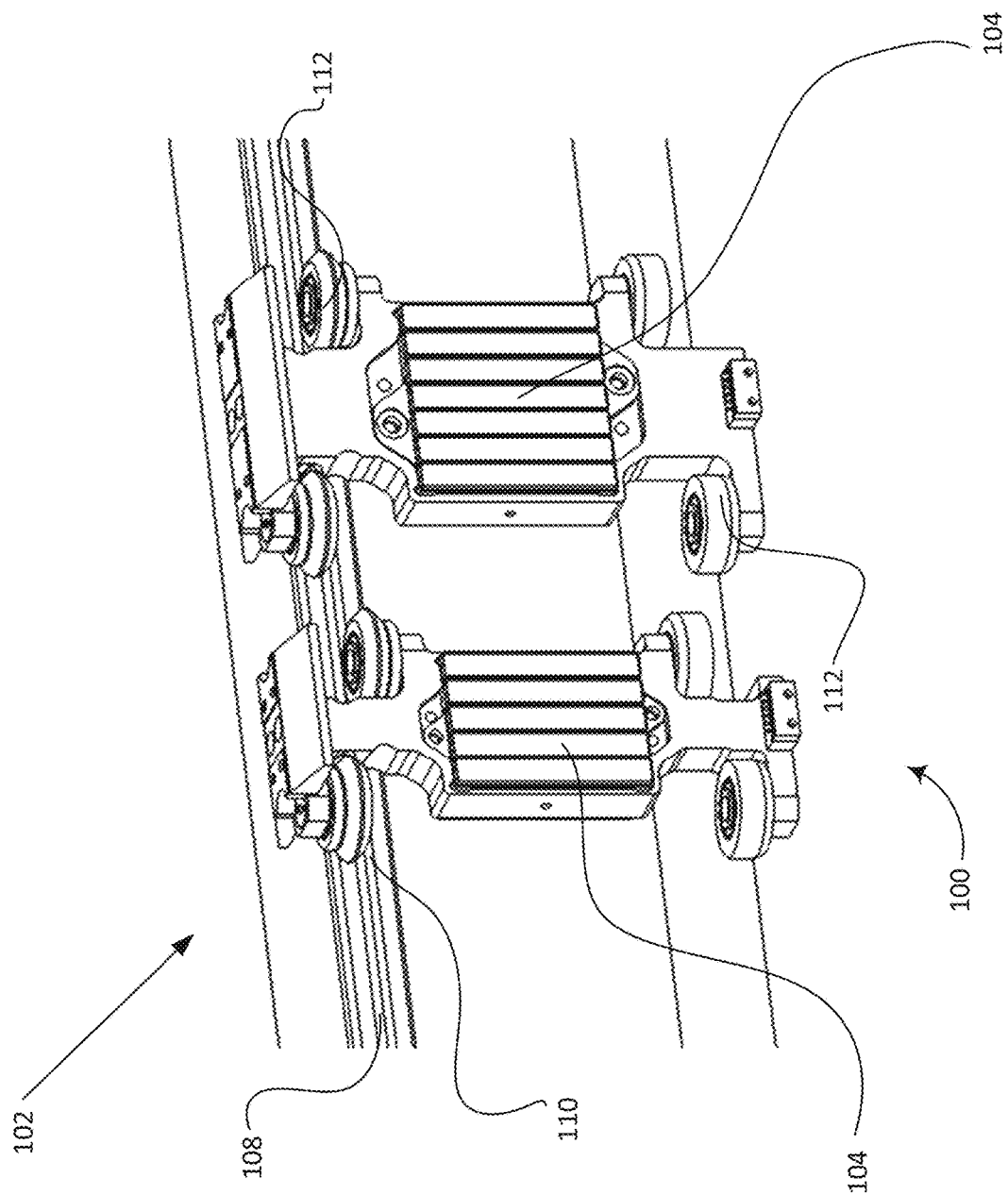
FIG. 3 shows a view of an embodiment of a track section with moving elements.

FIG. 3 illustrates an embodiment of a linear motor conveyor system 100 that includes a straight track section 102 and two moving elements 104. The track 102 may be made up of track sections 102, joined end-to-end, with one or more guide rails 108 of each track section 102 aligned with a guide rail 108 of adjacent track sections 102. In this embodiment, the track section 102 includes a guide rail 108 located in an upper portion of track section 102, and the guide rail 108 has dual shaped grooves 110, a lower guide rail 108 is flat. The moving elements 104 include bearings 112 that are correspondingly shaped in order to run along a corresponding guide rail 108, each bearing 112 running inside a respective shaped groove 110. The bearings 112 may be offset and such that for a moving element 104 having two shaped bearings 112, each shaped bearing may run inside a separate respective shaped groove 110.

In some embodiments, the track section 102 may produce a magnetic force for moving the moving element 104 along the track 102. The magnetic force can also capture/hold the moving element 104 on the track 102. In some cases, the magnetic force is created by the interaction of the magnetic flux created by coils (not shown) embedded in/under the track section and magnetic elements (not shown) of the moving element 104. The magnetic force can be thought of as having a motive force component for directing movement of the moving element 104 along a direction of travel on the track 102, and a capturing force component to laterally hold the moving element 104 on the track 102 and in spaced relation to the track surface. In at least some conveyor systems, the motive force and the capturing force can be provided by the same magnetic flux.

Generally speaking, the track sections 102, 103 will be mounted on a support structure (not shown) so as to align and abut one another in order to form the track 106. As noted above, each track section may be controlled by a control system or by a track control system 107 that controls a plurality of or all of the track sections. The control system 107 controls each track section (and thus the track) to drive the moving elements and also receives data related to a position of the moving elements on the track such that the controller effectively controls the moving elements. In some cases, where the track uses a servo motor or the like to drive the moving elements, the control system 107 can control the servo motor and thus control the moving elements.

In embodiments herein, reference numbers of elements may refer to those of the conveyor illustrated in FIGS. 2 and 3, however, this is intended to be for reference to similar elements only and elements of each embodiment may be used with other embodiments as would be appropriate for the application desired.

Where there are curvilinear or curved track sections in a linear motor conveyor system, conventional linear motor conveyor systems are typically constrained. In the case of a vertical linear motor conveyor, the moving elements are typically configured to travel along an outside curvature of a track and may require a wider radius. In particular, the end sections tend to be configured to allow the moving elements to turn around the outer circumference of the track, sometimes referred to as an outside curve. As such, the combinations available for the track generally have the moving elements travelling in the same direction, either turning left or right relative to the forward direction of the moving element. Conventional vertical linear motor conveyor systems do not tend to allow a moving element to make one turn then turn in the opposite direction (i.e. an inside curve may not be practical).

It is desirable to have an inside-curve track section or other system/method to simulate an inside curve in order to allow for various track configurations that may not be possible if the moving elements are only able to turn on an outside curve. In reviewing this need for an inside curve, it was determined that it may be most appropriate to strip/pry a moving element from one track and then place/release the moving element onto a different track or a different section of the same track. With this type of transport system, by using a rotatable body, a system for transporting could then rotate the moving element through an inside corner such as 90 degrees, or in fact through almost any angle, as desired. As such, a system for transporting a moving element, as detailed herein, may be used to remove a moving element off a first track section and place the moving element to a second track section. The second track section may be oriented in a different direction, for example a 45-degree turn, a 90-degree turn, a 135-degree turn, a 180-degree turn, or other angle, potentially all the way up to 360-degrees, relative to the first track section. As such, in some cases, the system may replace the moving element on the same track but delayed. In this way, the system herein could be used for queueing moving elements or the like.

Figure 4:
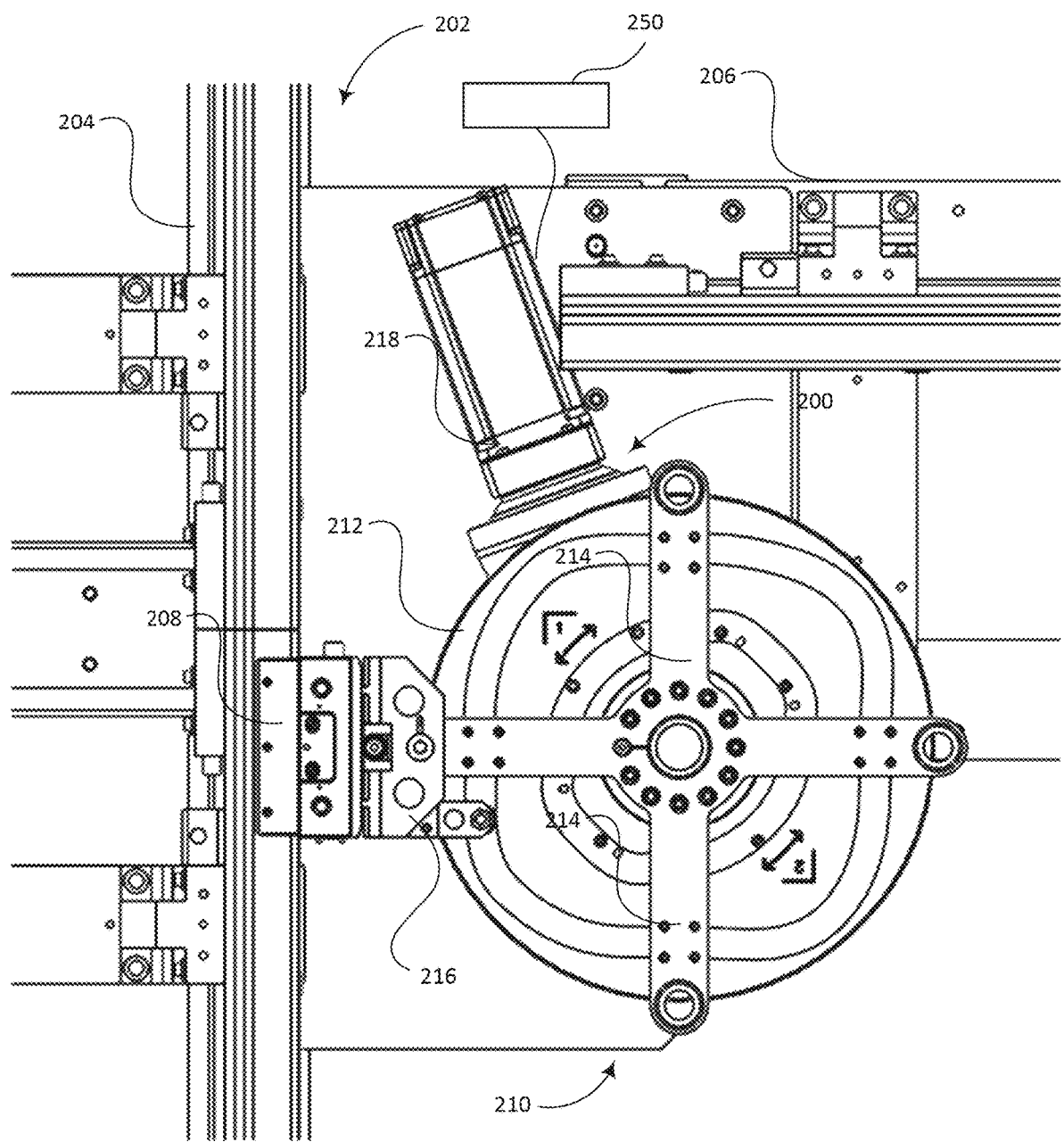
FIG. 4 illustrates an embodiment of a system for splitting and placing a moving element on a linear motor conveyor system.

FIG. 4 illustrates a system 200 for transporting a moving element on a linear motor conveyor system 202. In this illustration, the system 200 operates as an "inside curve" on a vertical linear motor conveyor. The conveyor system 202 includes a first track section 204 and a second track section 206 configured to transport a moving element 208. The second track section 206 may be a portion of a single track including the first track section, may be connected to the first track section, or may be separated or discontinuous from the first track section 204. In some cases, the second track section 206 may be oriented at a 90-degree angle from the first track section 204, as illustrated. In other cases, the second track section may be oriented at any appropriate angle from the first track section. Generally speaking, the second track section 206 may be in a position such that the moving element 208 is not able to continue directly from the first track section 204 to the second track section 206 (e.g. due to a sharp curve, a disconnection, or the like), although there may be situations where a moving element is stripped and placed on the same or a connected track section or track.

The system 200 includes a transporter 210. The transporter 210 may include a rotatable element, in this case, the rotatable wheel 212, having at least one axial spoke 214 (four are illustrated in FIG. 4). The at least one axial spoke 214 includes a coupler 216 for engaging with a moving element. Further information on embodiments of the coupler is provided below.

The system 200 also includes a motor 218 to drive the rotary wheel 212. The motor 218 may be, for example, a servo motor, which allows control of the position, speed, etc. of the rotary wheel 212. In some cases, the motor 218 may use other drive systems, for example, a mechanical or electric motor with constant or variable speed, or the like.

The system 200 also includes a control system 250. The control system 250 may control the system 200 or may be a part of the controller 107 that controls the track more generally. In some cases, the control system 250 may be operatively connected to the controller 107 to exchange data or the like.

Figure 5:
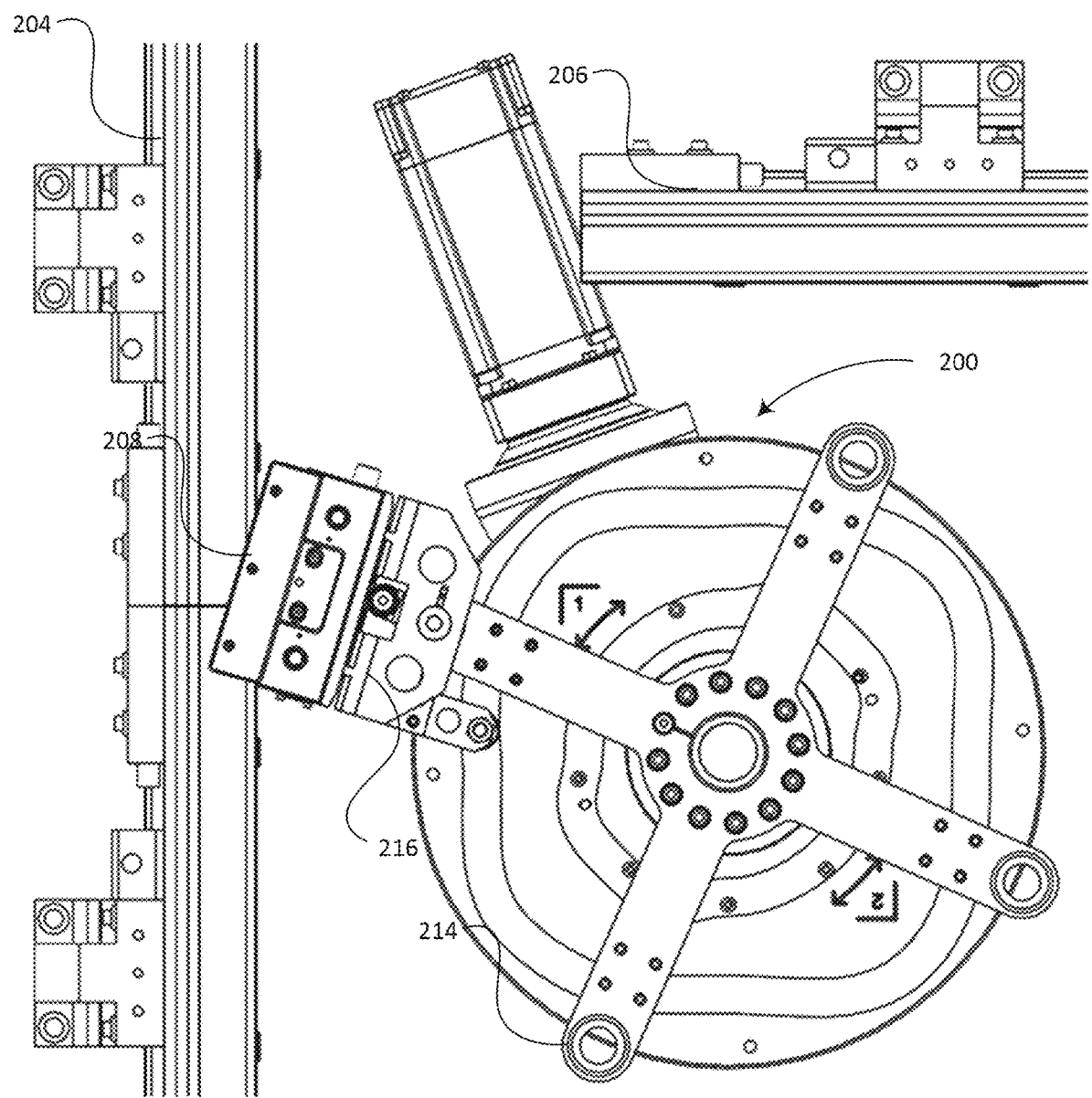
FIG. 5 illustrates the system of FIG. 4 as a moving element is stripped from one track section.

FIG. 5 illustrates the system 200 as the system 200 transports the moving element 208 from the first track section 204 to the second track section 206. The coupler 216 removably attaches to the moving element in order to remove it from the first track section 204. The wheel rotates the moving element in order to align the moving element 208 with the second track section 206. Once aligned, the coupler 216 releases the moving element 208 onto the second track section 206 and the moving element 208 may then travel in the direction of the second track section 206. In some embodiments, the coupler 216 may include a mechanical gripper, a magnetic gripper, or any of various types of grippers. In some embodiments, the moving element may be supported on the first track by guide rails or the like. In these cases, the coupler may also be configured to overcome or disengage the guiderails in some manner to allow the moving element to be released.

Figure 6A:
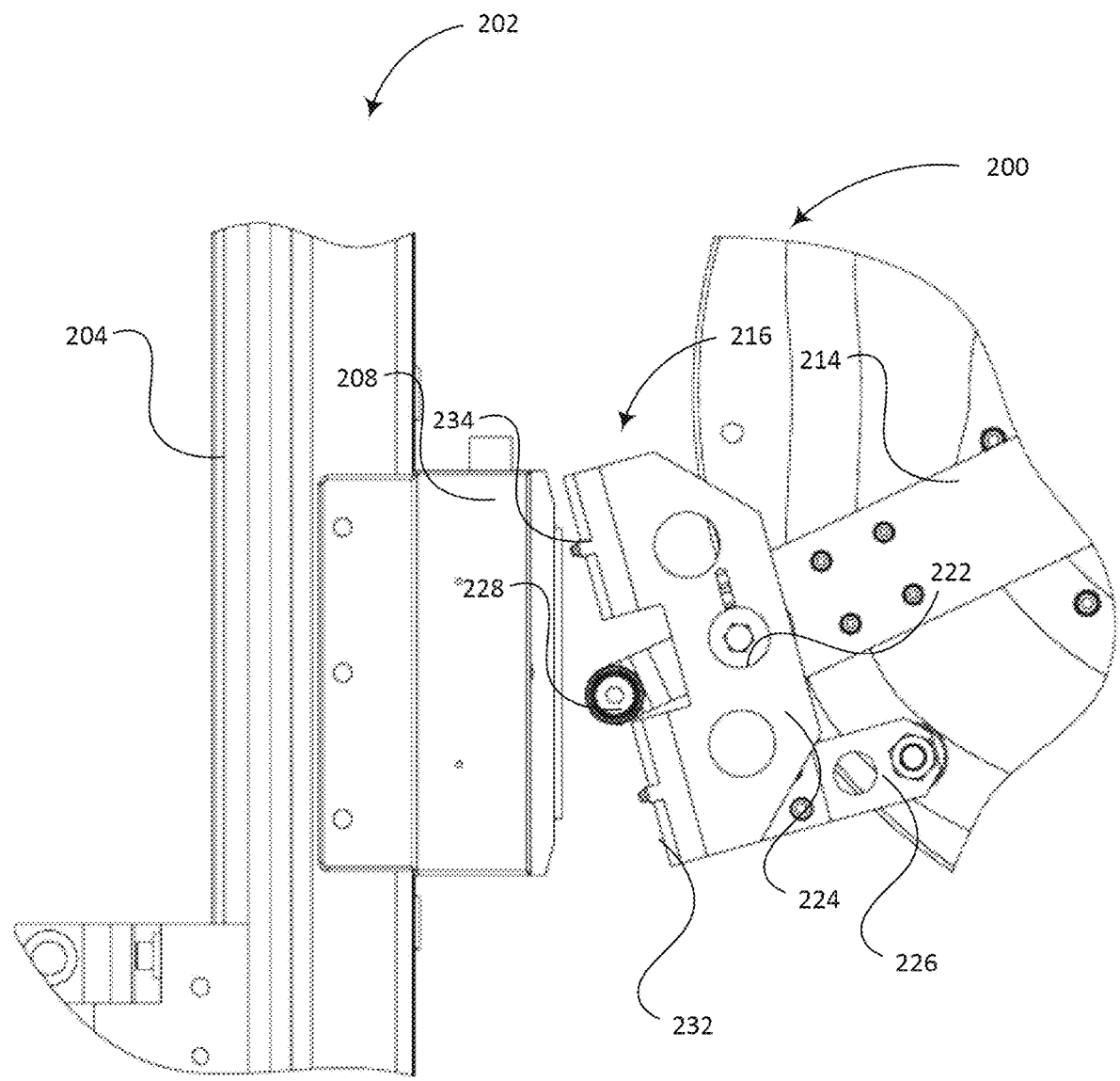
FIG. 6A to 6G illustrates the system of FIG. 4 during the splitting of a moving element from a conveyor track according to an embodiment.

FIGS. 6A to 6G illustrate the operation of the system 200 when splitting the moving element from the track. In particular, FIGS. 6A to 6G focus on an embodiment in which the system 202 makes use of an example of a coupler having a magnetic connection to the moving element and the system makes use of cam driven control to manipulate the coupler. It, will be understood that other types of couplers may not need to be cam driven in a similar way and may include only a mechanical or magnetic connection or the like. As shown in FIG. 6A, the coupler 216 includes a coupler head 224, a coupler cam 226 for driving/controlling the coupler head, a roller head 228 for contacting the moving element, and a roller cam 230 (shown in FIG. 7) for driving/controlling the roller head. The coupler head includes at least one magnet 232. In this case, the coupler head also includes at least one spacer 234. In some cases, the spacer may also be configured to be a positioner, which fits with a corresponding moving element positioner to align the coupler to the moving element.

Figure 6B:
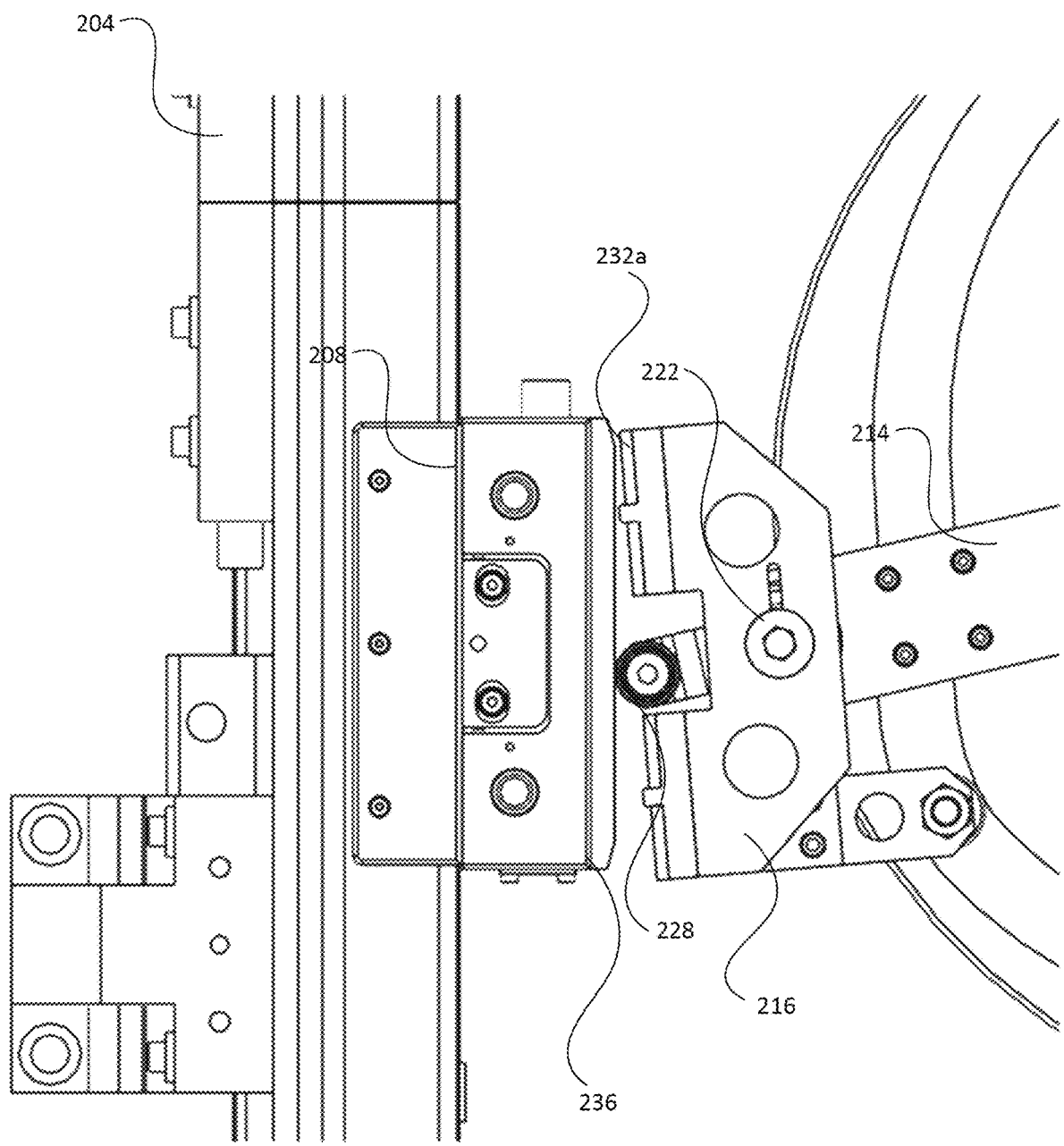
Figure 6C:
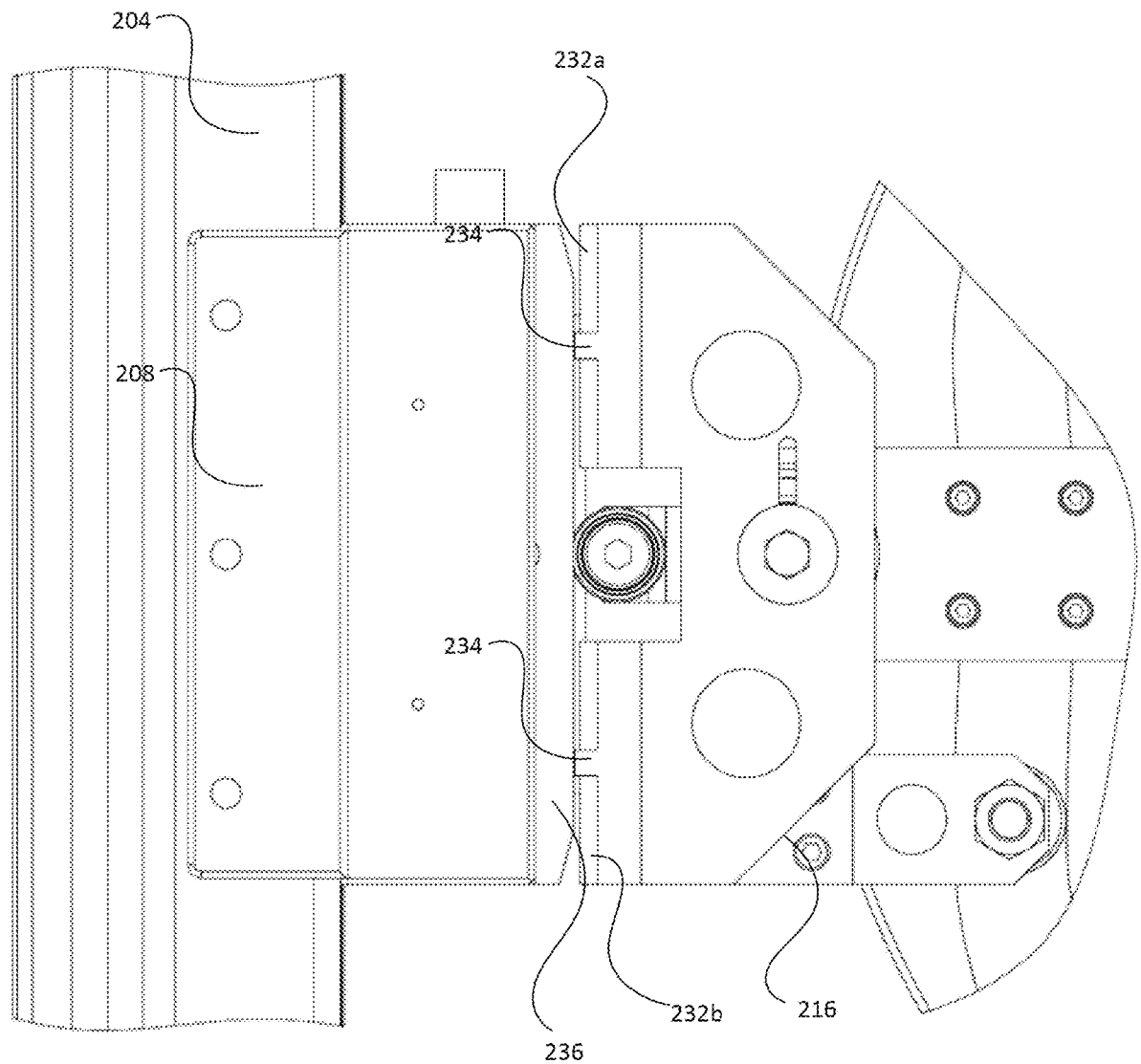
Figure 6D:
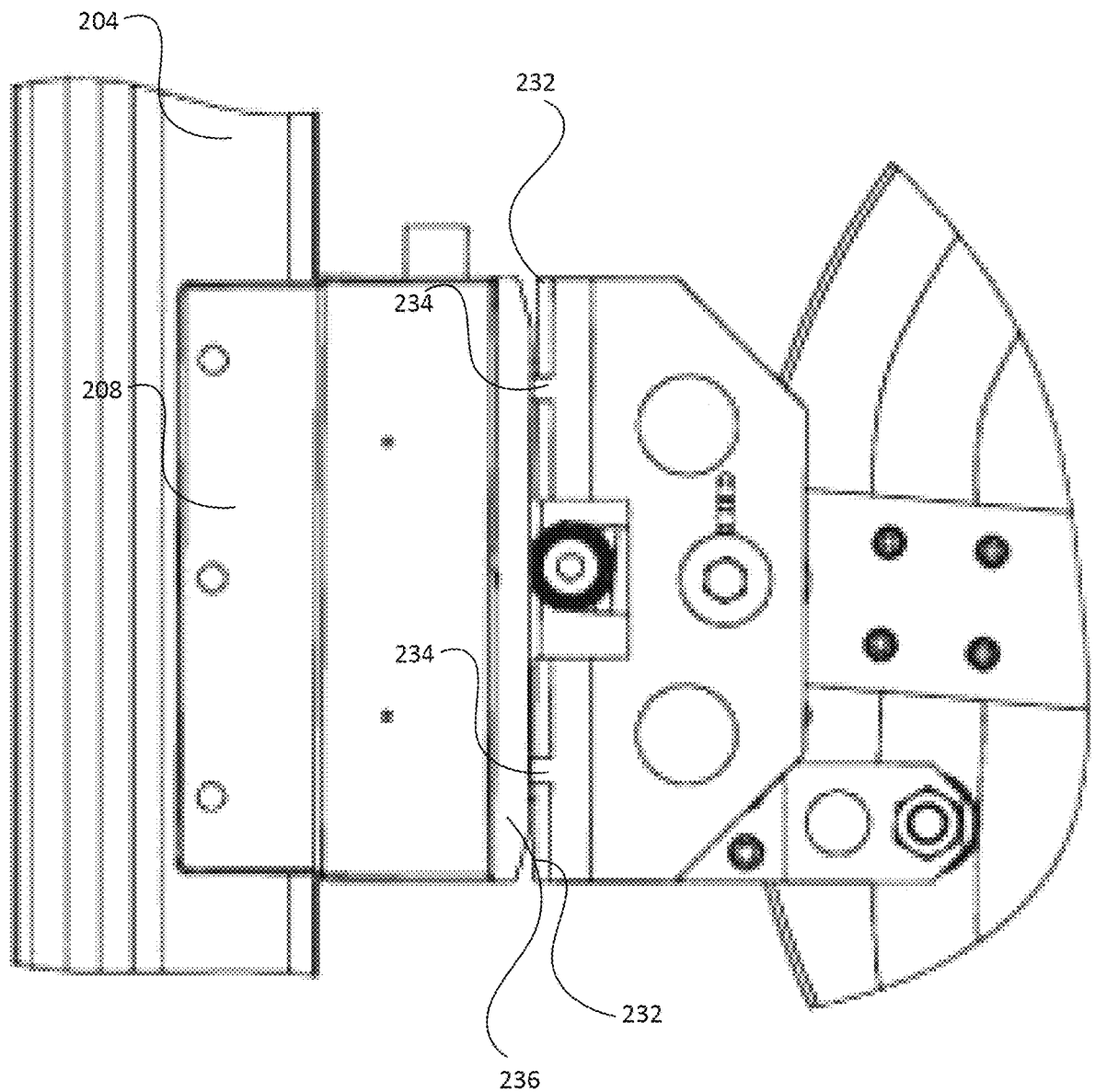
Figure 6E:
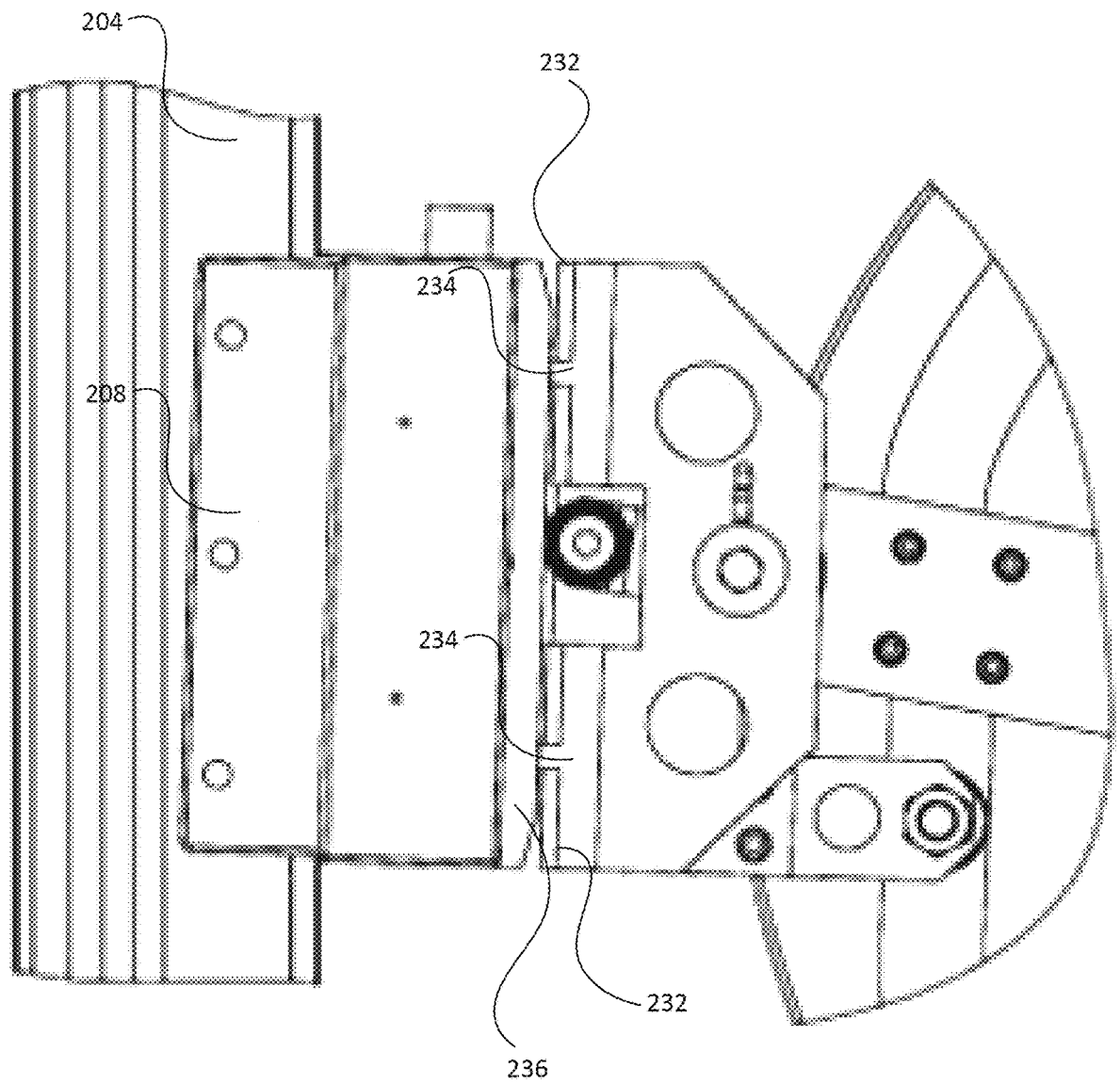
Figure 6F:
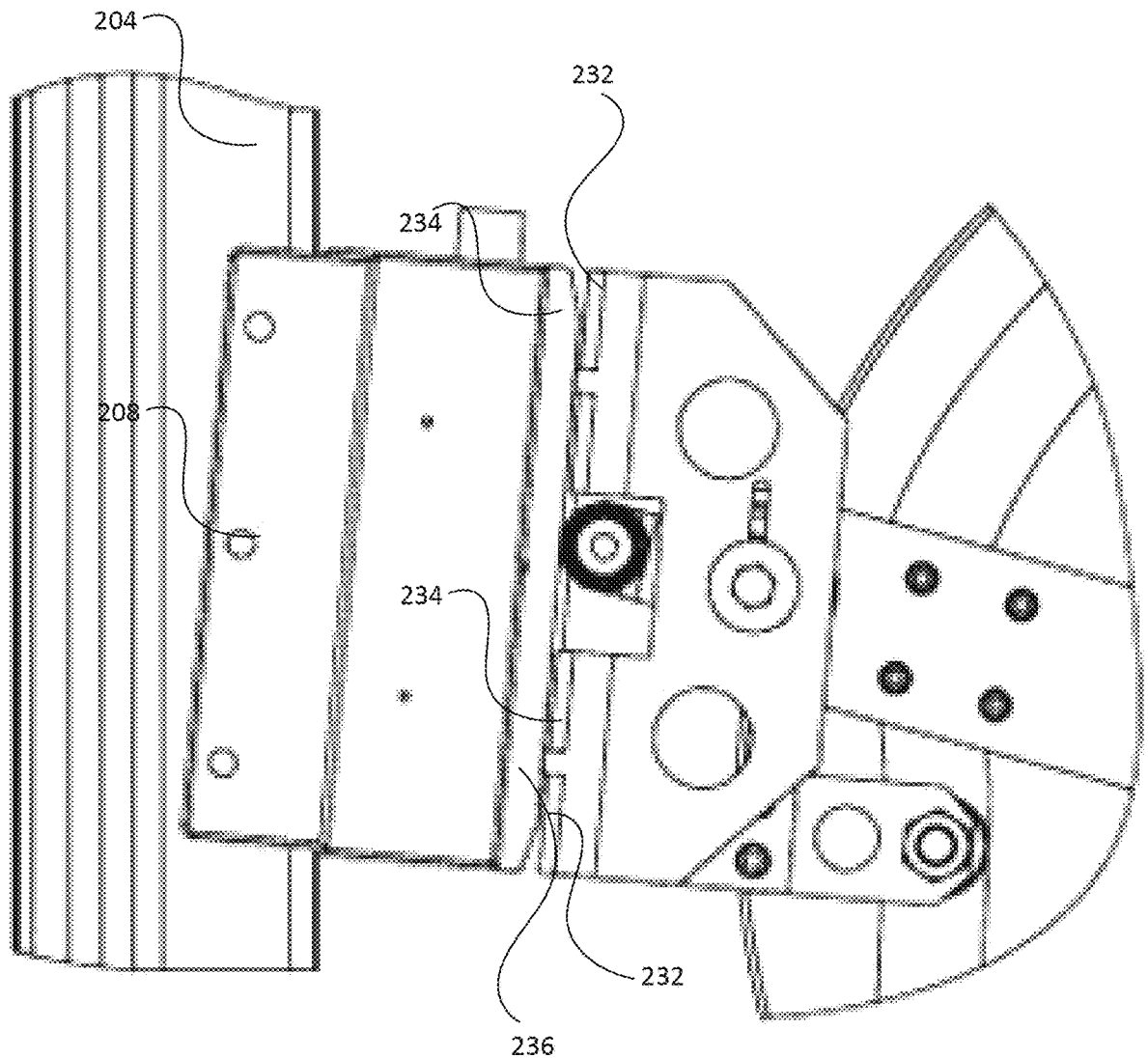
Figure 6G:
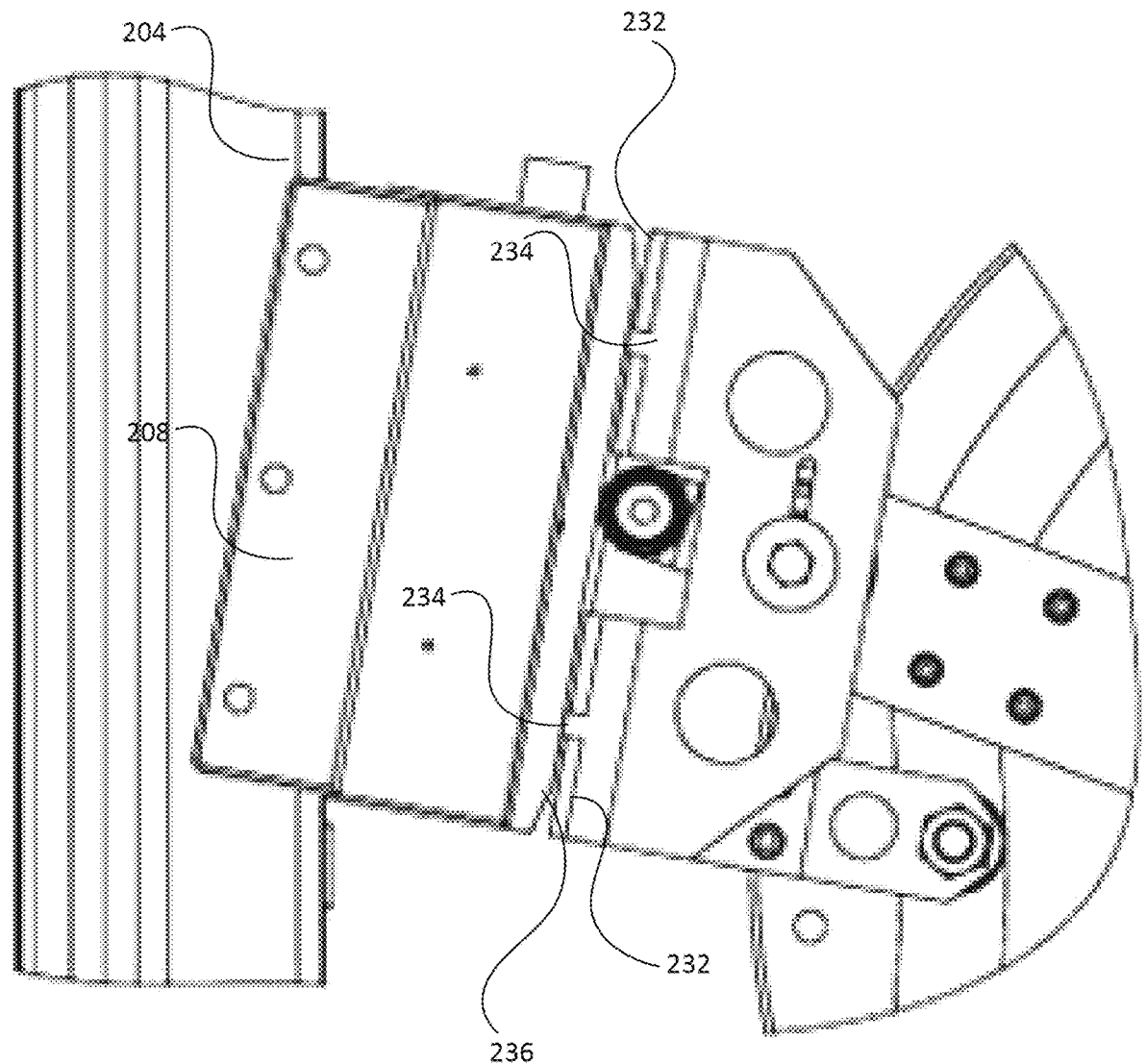

FIG. 6A illustrates the coupler 216 as it approaches the moving element 208. The coupler head 224 is configured to pivot in relation to the first track such that the coupler head 224 can approach the moving element 208 on the first track 204 and then be pivoted to make contact with the moving element 208. As shown in FIG. 6B, the coupler 216 may include the roller head 228, which is configured to abut against the moving element 208 as the coupler 216 approaches. The roller head 228 is intended to reduce any knocking or movement while the moving element 208 is being transported from the first track section 204 to a second track section 206. As the coupler head approaches the moving element 208, the coupler head 224 pivots around a connection to the arm (pivot 222) via the coupler cam. In FIG. 6B, a first magnet 232a comes into range of a steel plate 236 on the moving element 208 and in FIG. 6C, a second magnet 232b comes into range. The two magnets 232 are maintained at a predetermined distance from the steel plate by a spacer 234, which maintains an air gap between the steel plate 236 and the magnets 232. The spacer 234 is intended to prevent any jarring contact between the magnets 232 and the steel plate 236 and can help to control the magnetic force. In FIG. 6D, the system 200 begins to split/pry the moving element 208 away from the first track 204. As noted herein, the system 200 must split/pry the moving element 208 away from the first track 204 because of the need to overcome the magnetic forces holding the moving element 208 to the first track 204. As such, the magnetic forces exerted by the magnets 232 on the steel plate 236 must be sufficient to overcome the forces holding the moving element 208 to the first track 204. In some cases, it may be possible to control the first track 204 to reduce the forces holding the moving element 208 to the track. FIGS. 6E to 6G illustrate the subsequent steps as the moving element 208 is stripped/pried from the first track 204 by the turning of the rotary wheel and the action of the coupler head 224 as controlled by the coupler cam 226.

Figure 7:
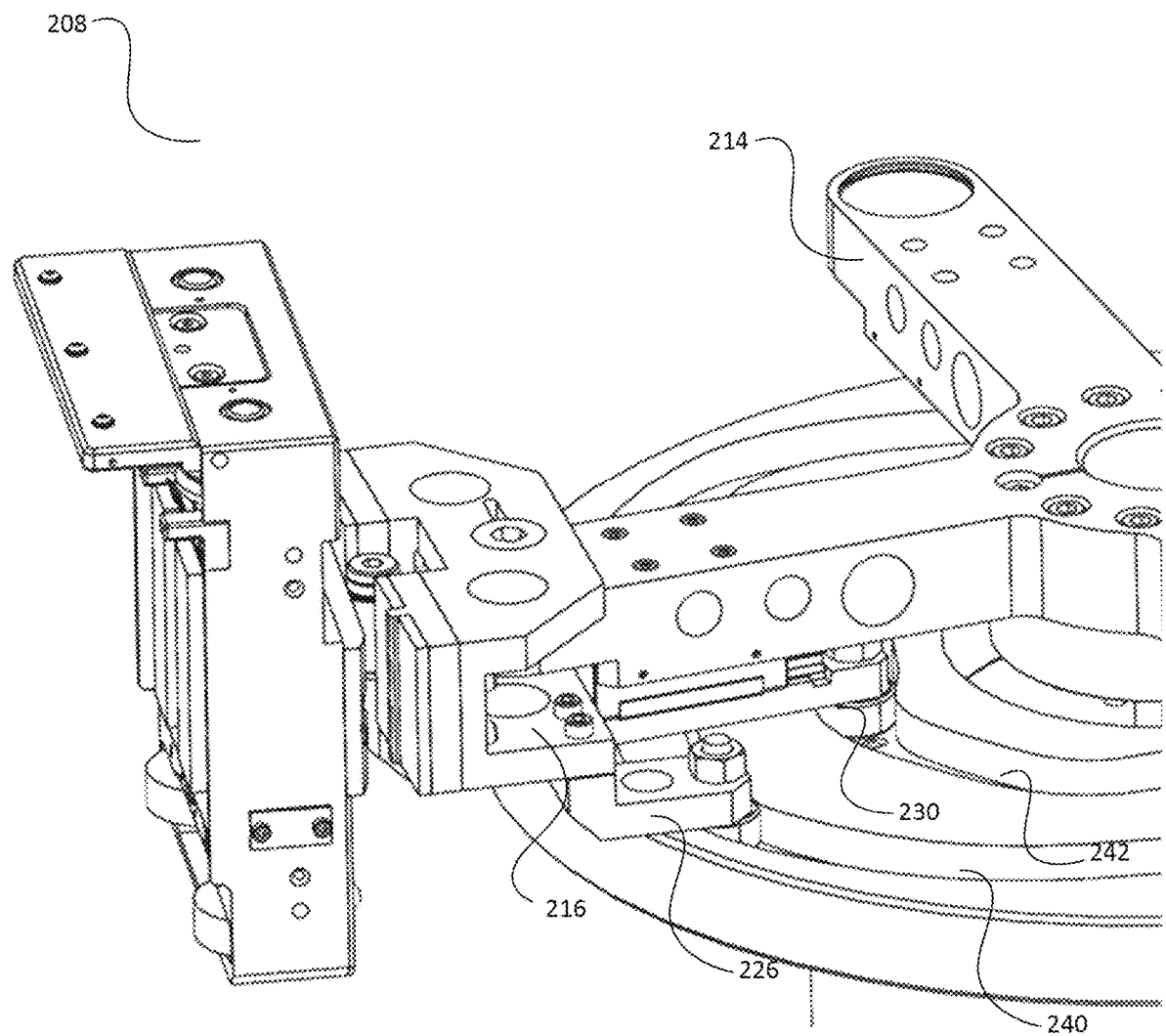
FIG. 7 shows a perspective view of the interaction between the system and moving element.
Figure 8:
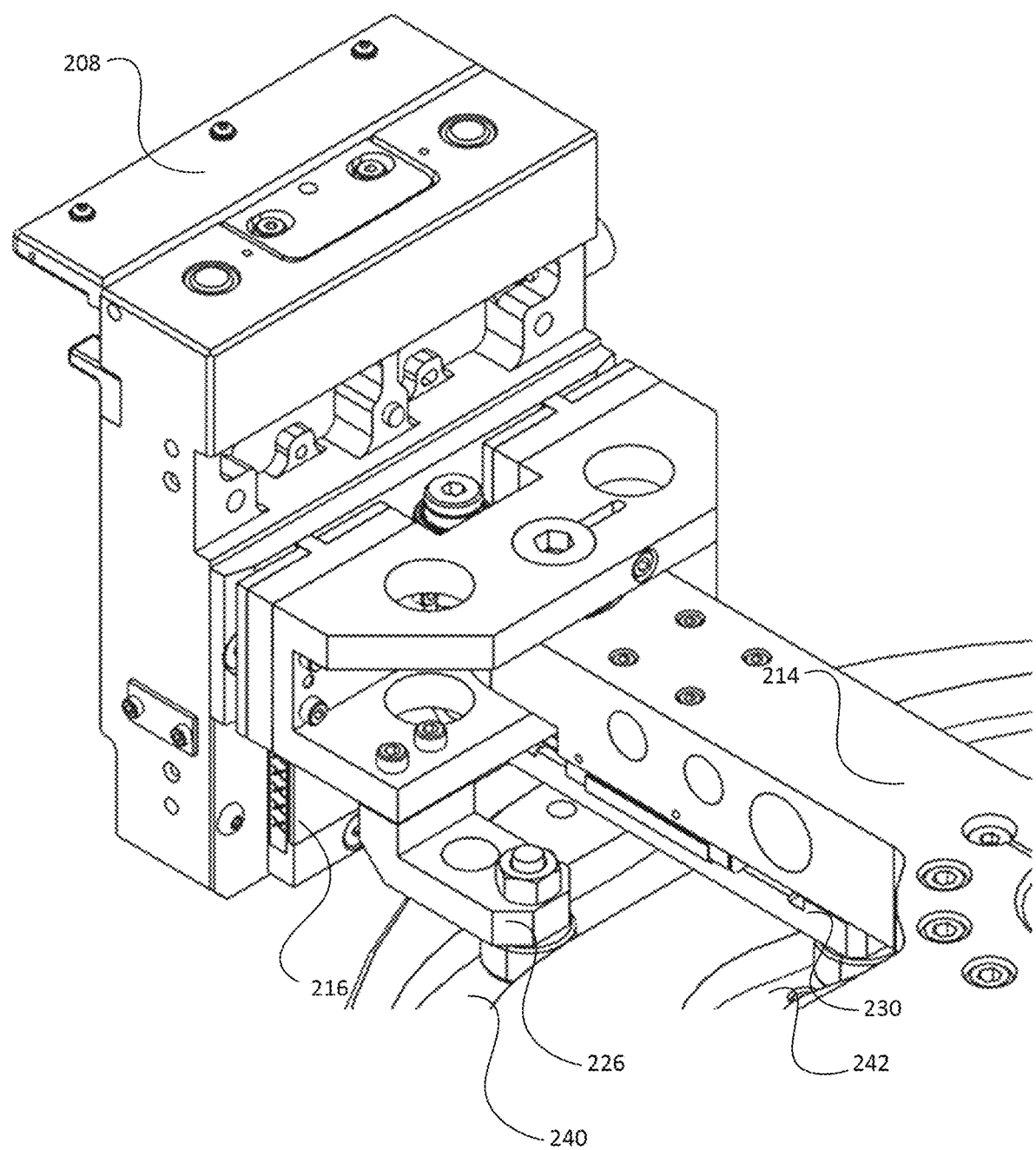
FIG. 8 shows another perspective view of the interaction between the system and moving element.

FIG. 7 is a side perspective view that illustrates the coupler 216 as it moves towards the moving element 208 in greater detail. FIG. 8 is a top perspective view illustrating the coupler attached to the moving element 208. In FIGS. 7 and 8, it can be seen that the axial spoke 214 is supported above the rotary wheel, which includes cam grooves, a coupler cam groove 240 for the coupler cam 226 and a roller head cam groove 242 for the roller head cam 230.

Figure 9A:
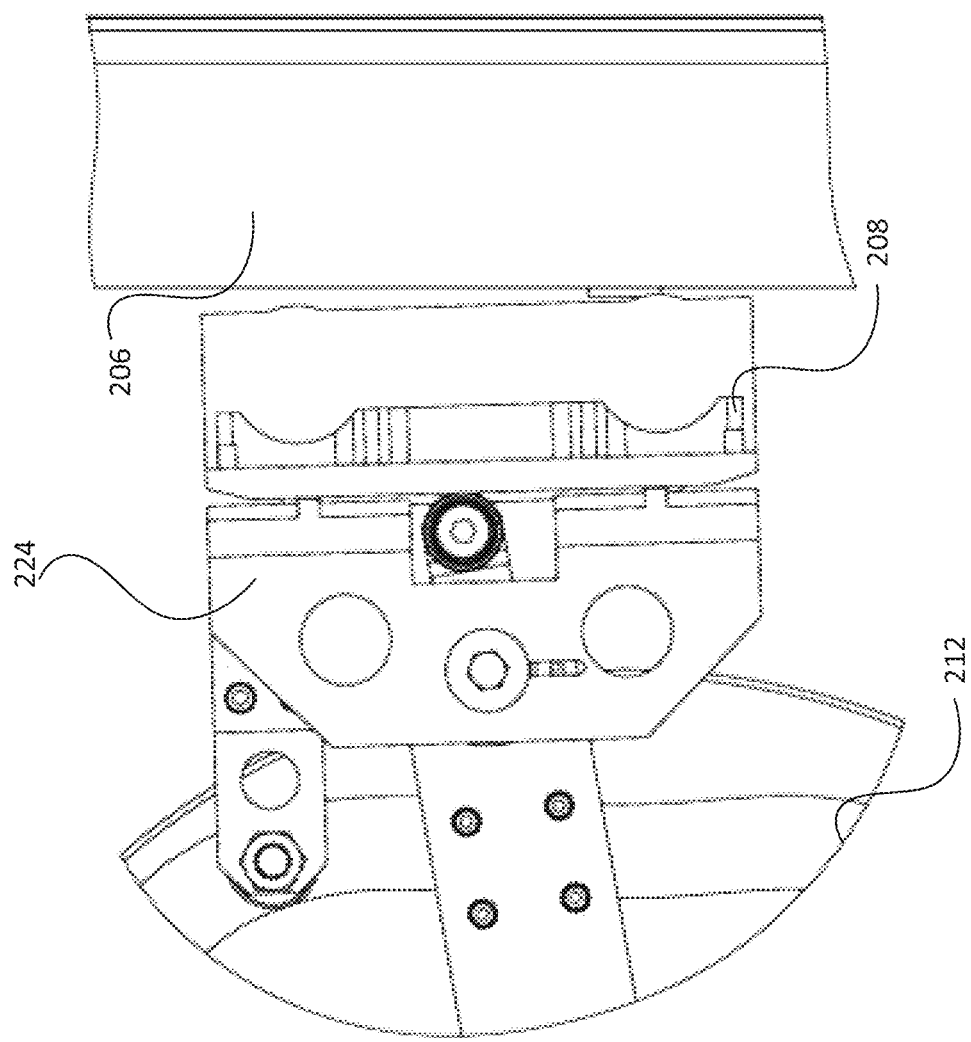
FIGS. 9A to 9F illustrates the system of FIG. 4 during the placing of a moving element on a conveyor track according to an embodiment.
Figure 9B:
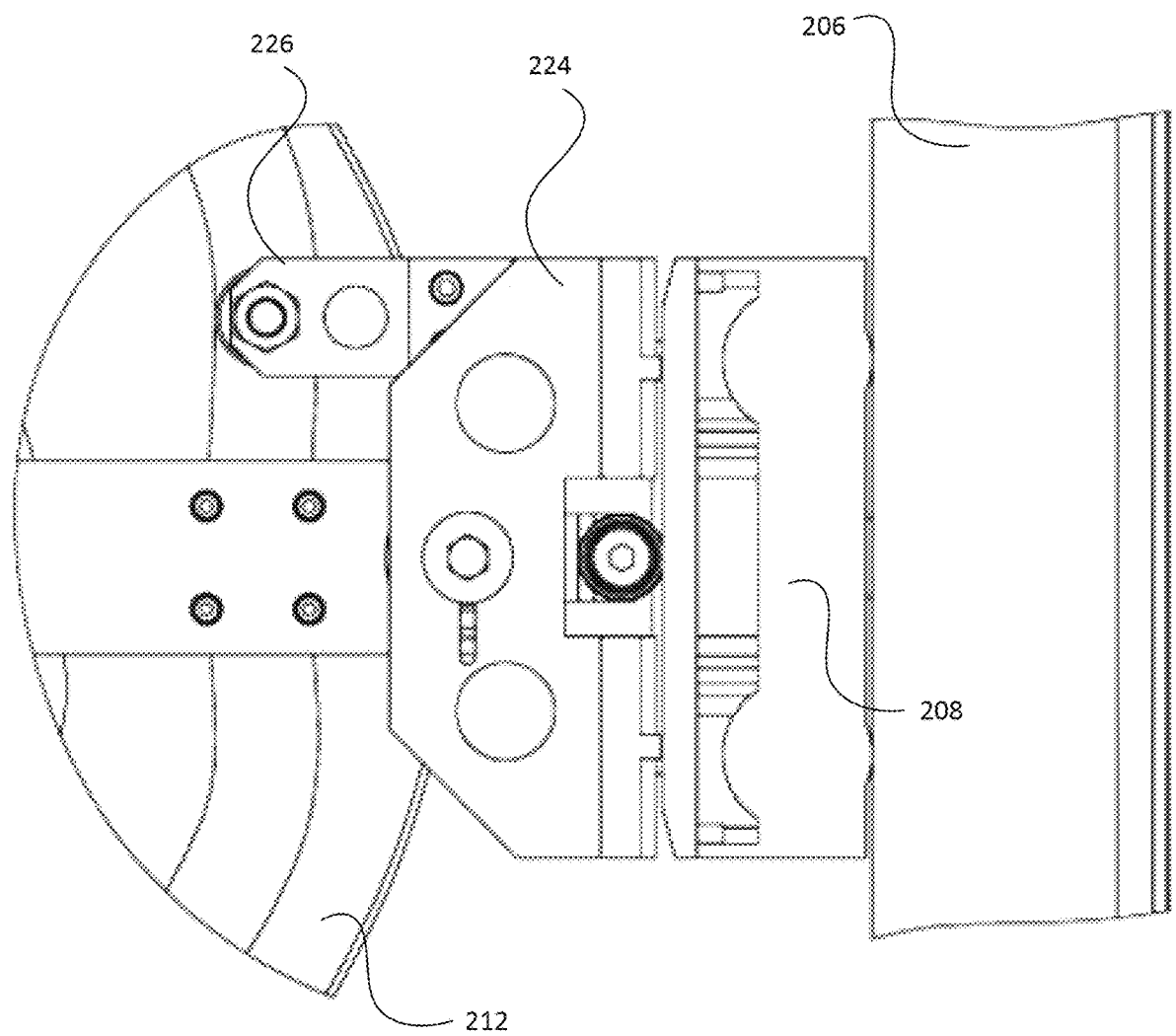
Figure 9C:
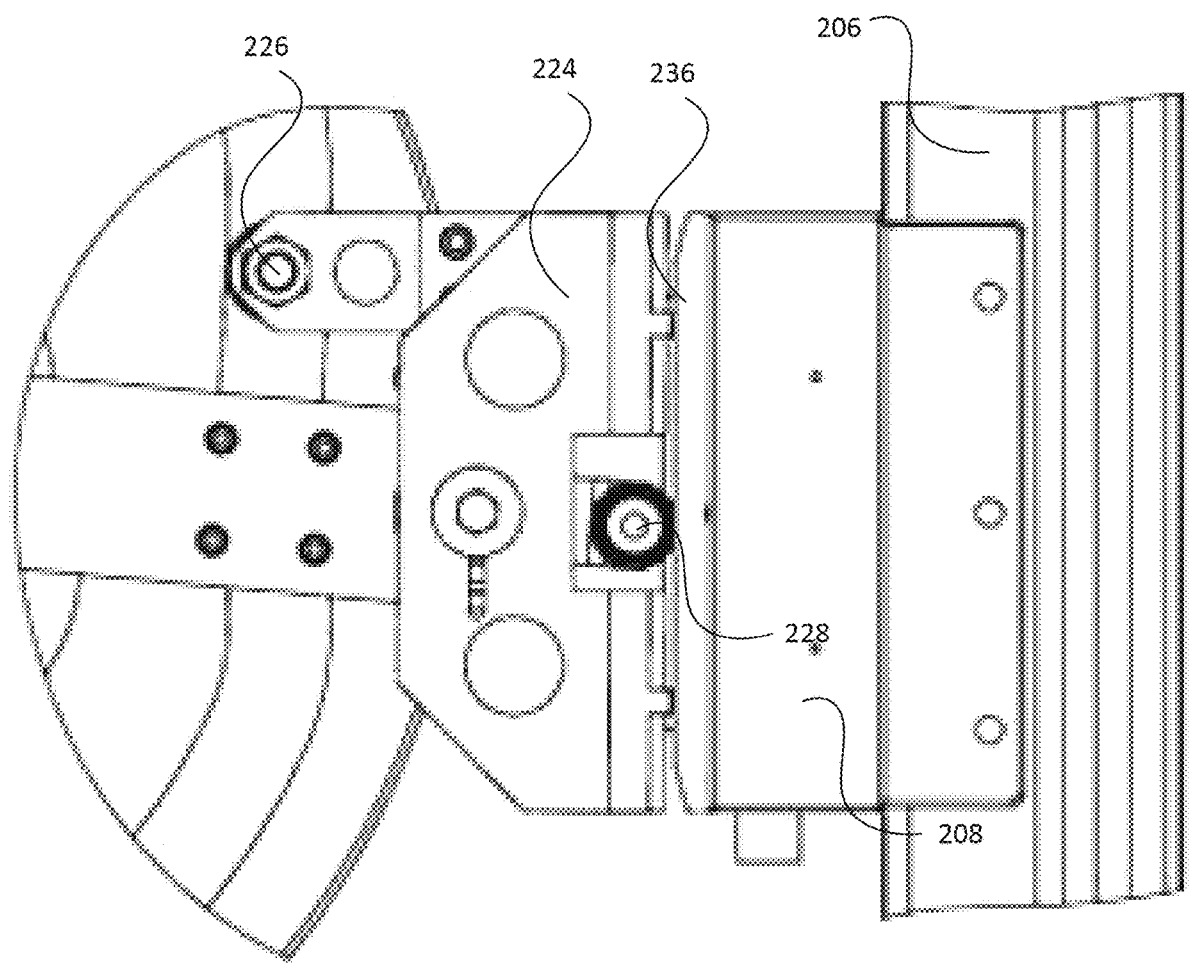
Figure 9D:
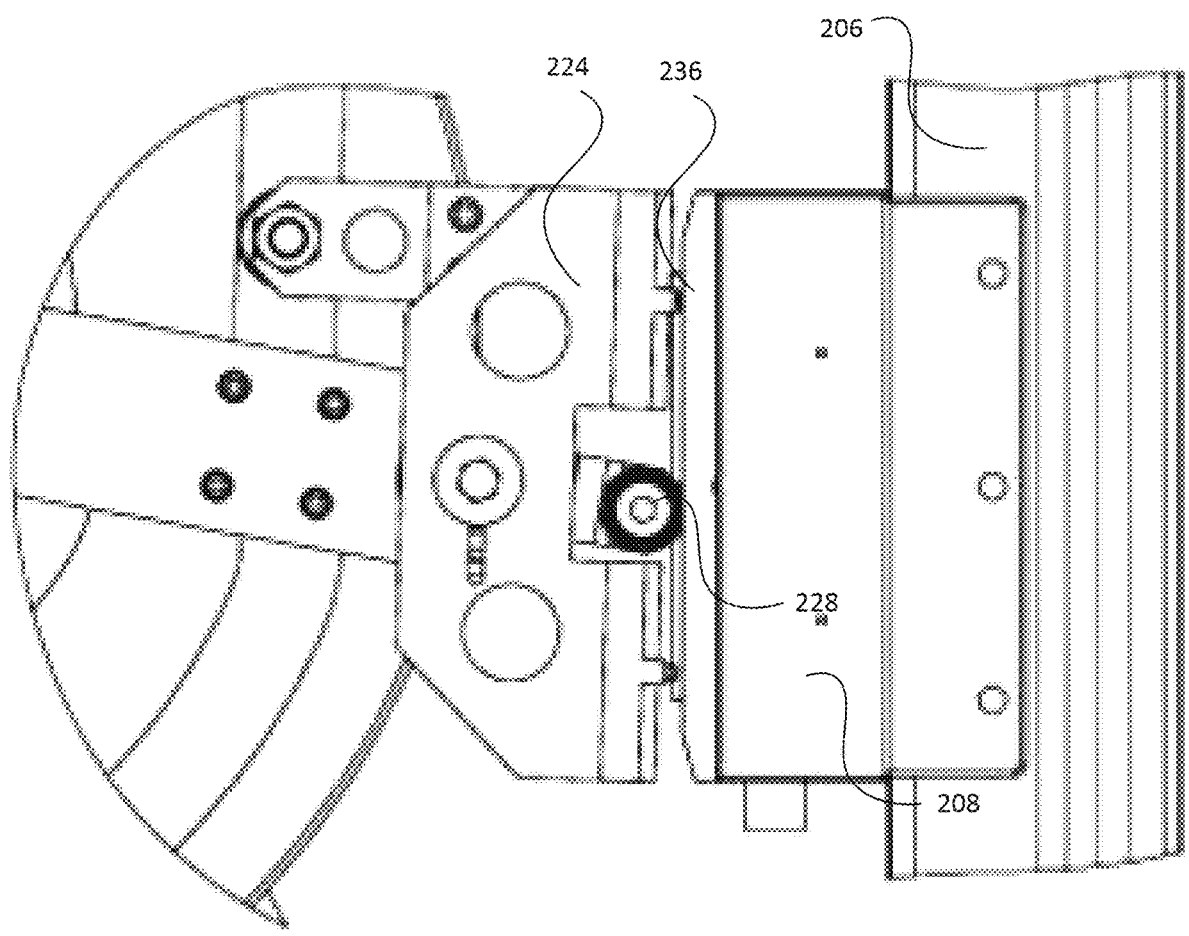
Figure 9E:
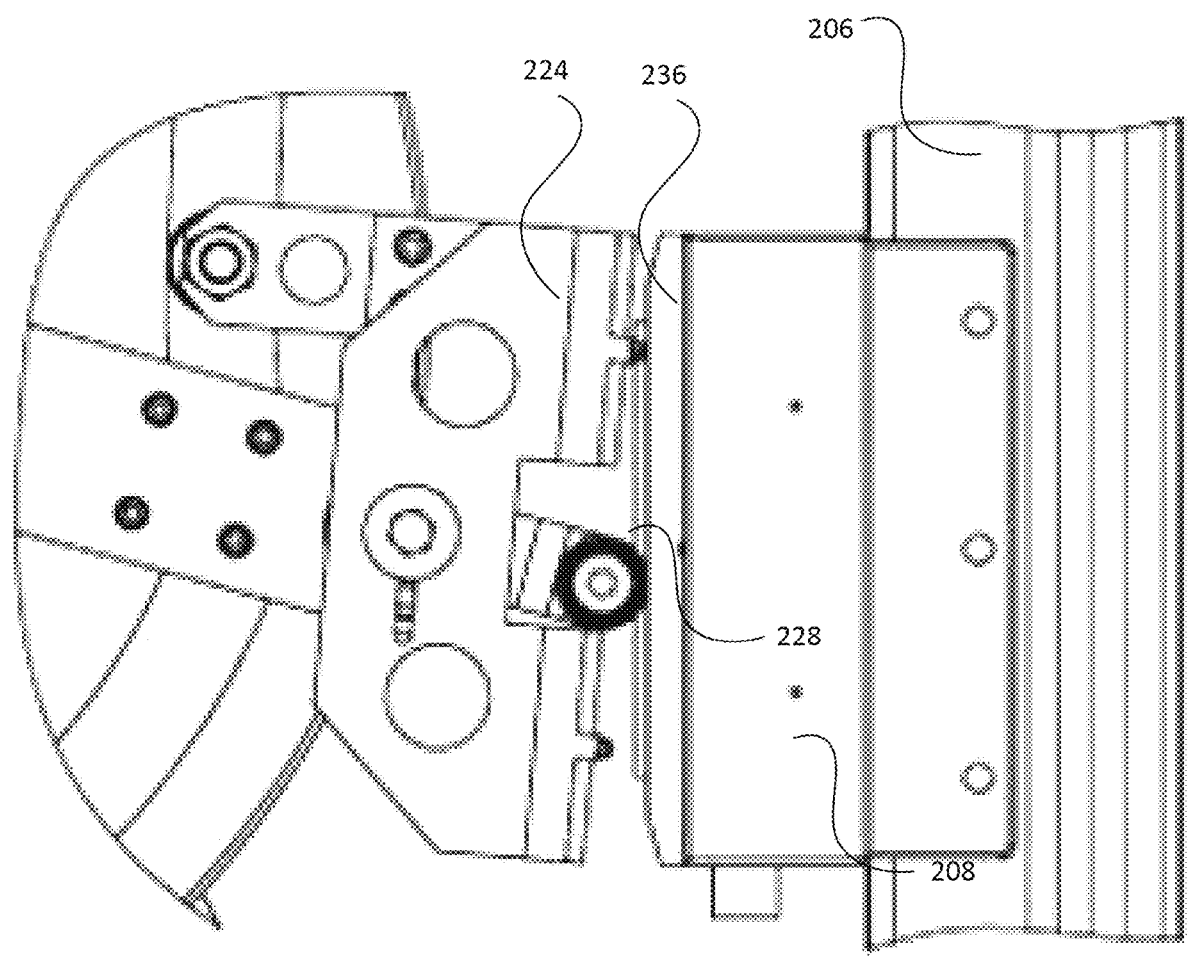
Figure 9F:
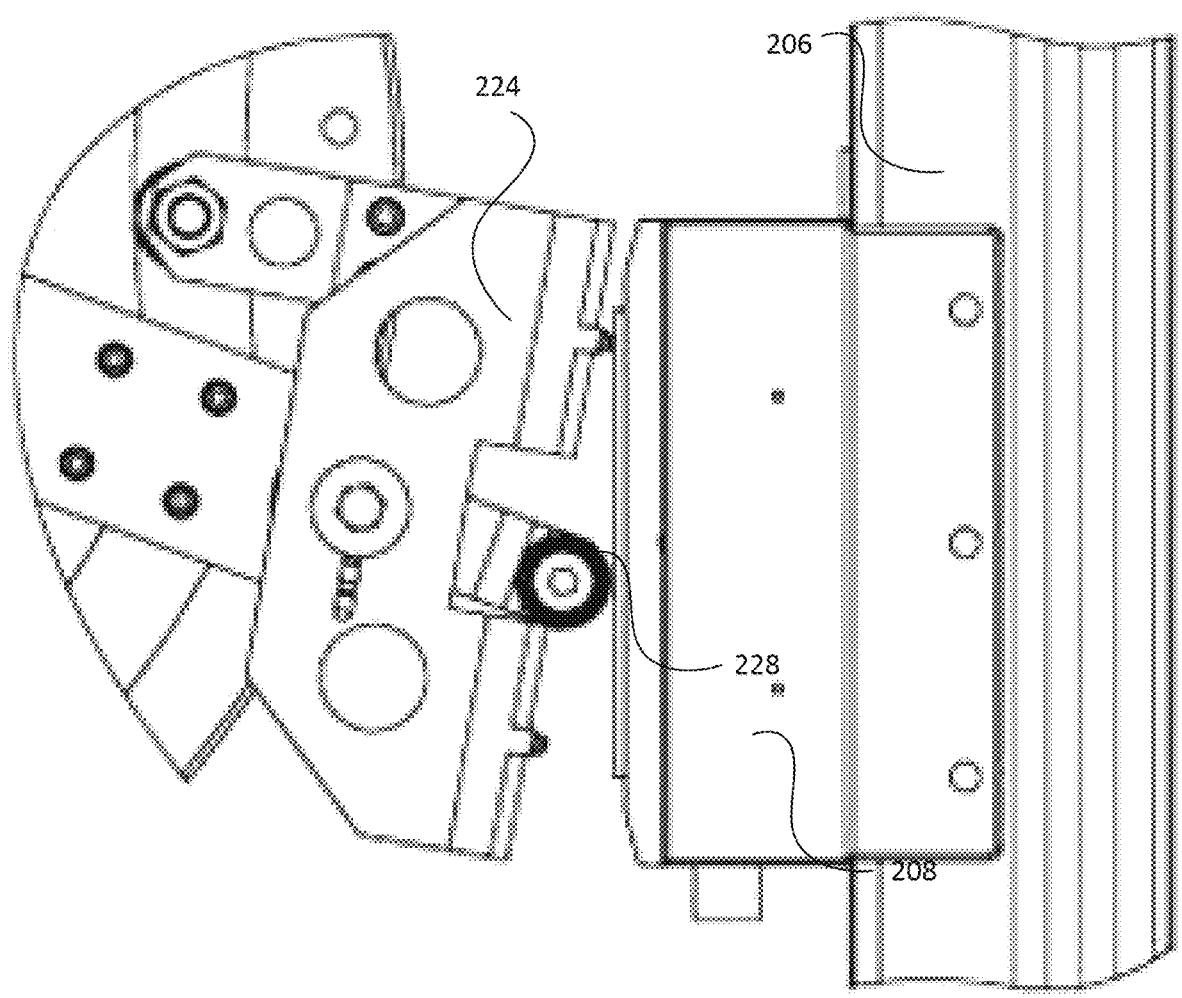

FIGS. 9A to 9F illustrate the placing of the moving element 208 on the second track 206. FIGS. 9A and 9B show the moving element 208 as a schematic with an upper portion removed to illustrate the contact of bearings 112 on the moving element 208 as the moving element 208 makes contact with the second track 206. As the moving element 208 approaches the second track 206, a forward bearing makes contact as shown in FIG. 9A. The continued rotation of the rotary wheel 212 brings a rear bearing into contact as shown in FIG. 9B. In this process, the orientation of the coupler head 224 is controlled by the coupler cam 226 to allow for a smooth transition. In FIG. 9C, the coupler head 224 begins disengaging from the moving element 208. In this embodiment, the roller head 228 is controlled by the roller head cam 230 to apply pressure to the steel plate 236 on the moving element 208 in order to push the moving element away from the coupler head 224 as illustrated in FIGS. 9D and 9E. In FIG. 9F, the coupler head 224 moves away from the moving element 208.

Figure 10:
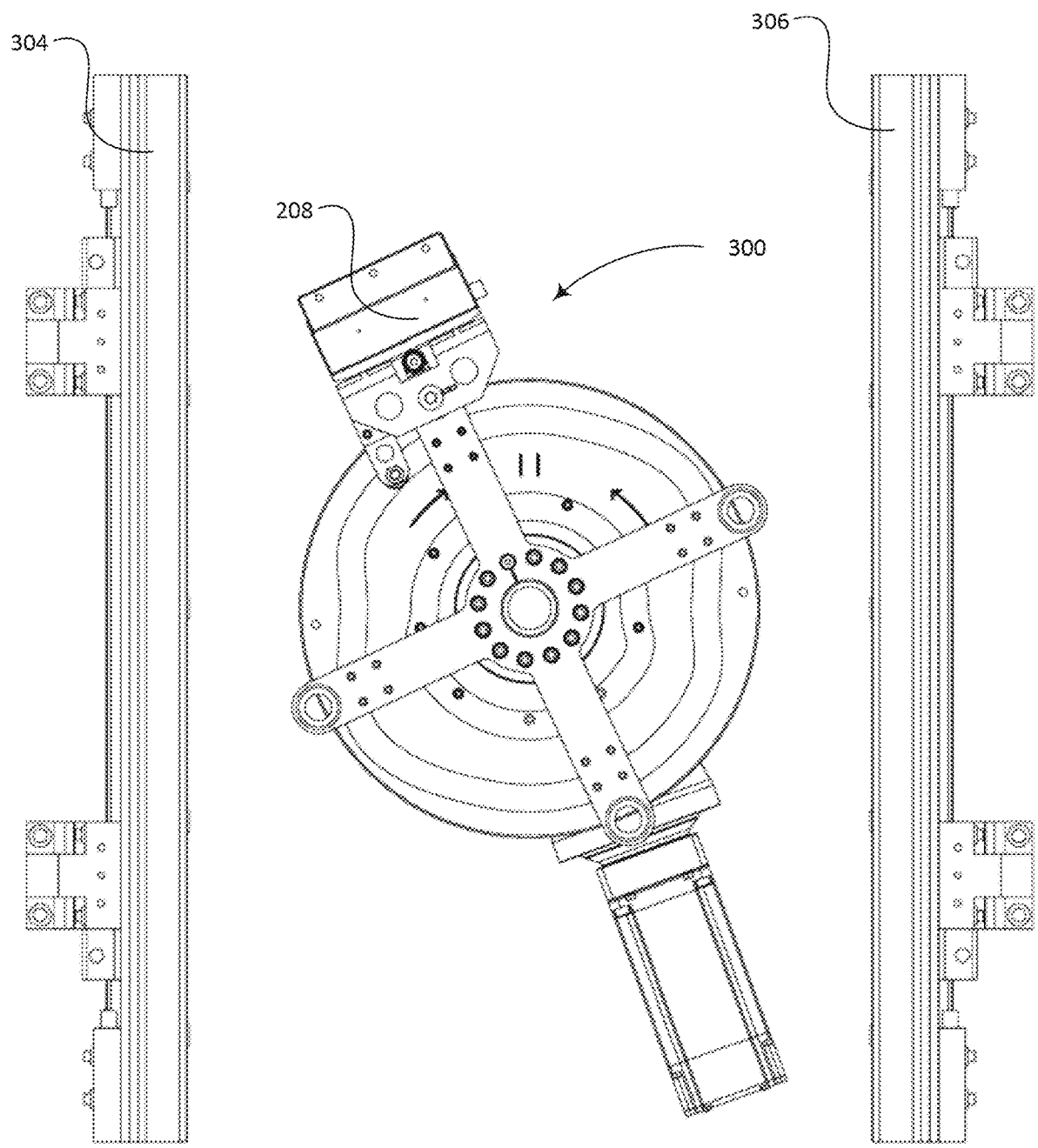
FIG. 10 illustrates another embodiment of a system for splitting and placing a moving element on a linear motor conveyor system.
Figure 11:
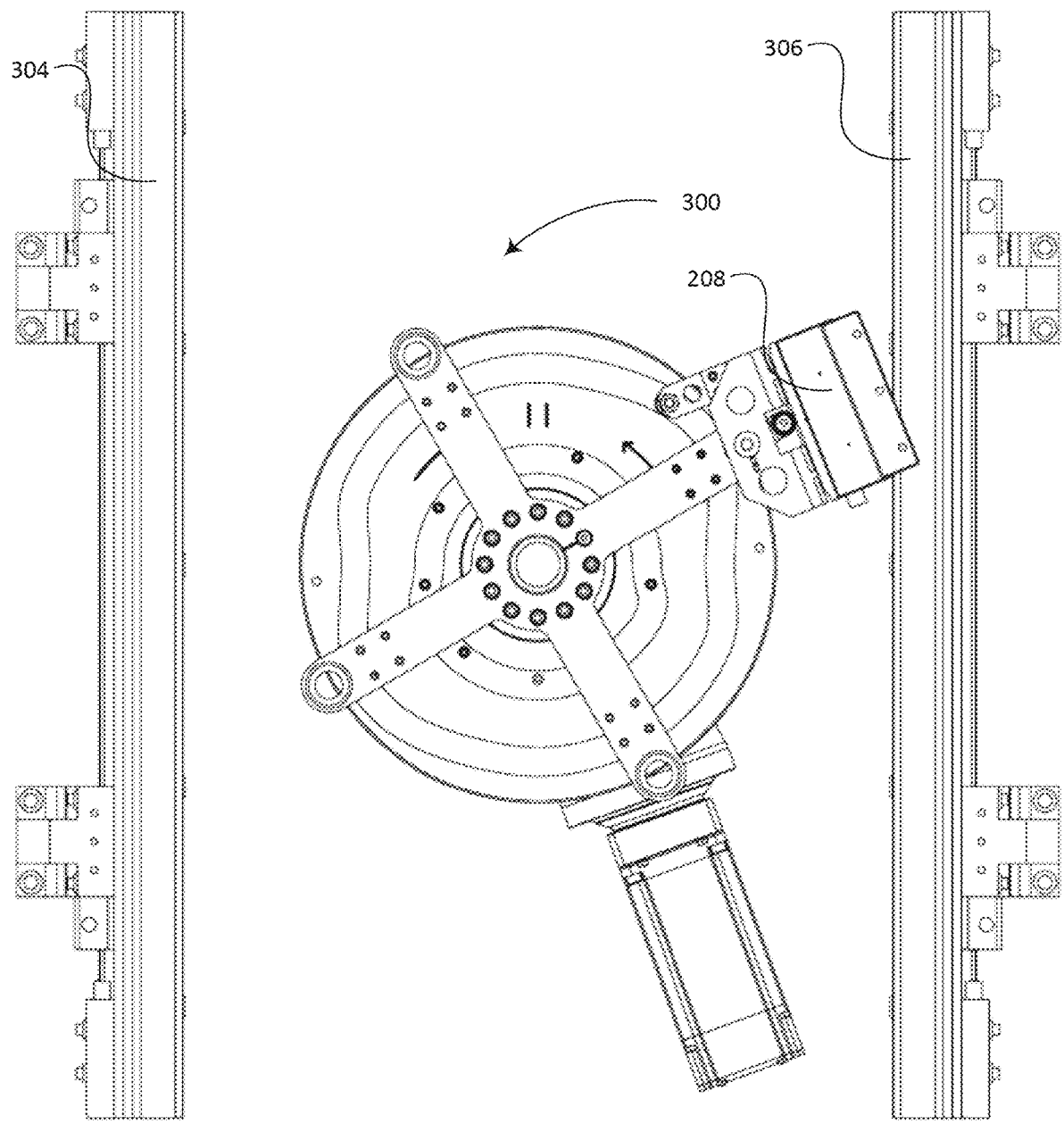
FIG. 11 illustrates another view of the system of FIG. 10.
Figure 12:
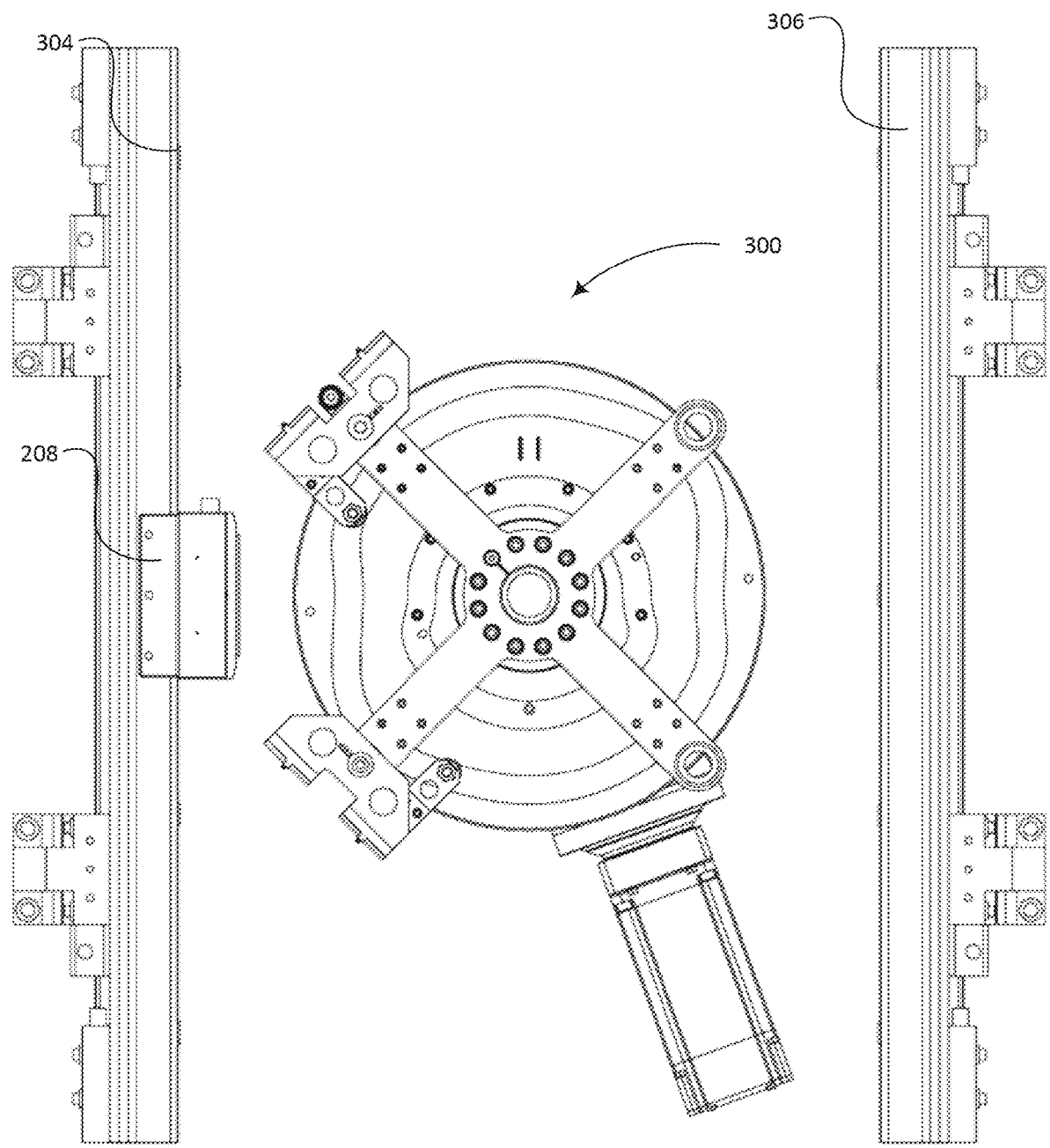
FIG. 12 illustrates another embodiment of a system for splitting and placing a moving element on a linear motor conveyor system.

FIGS. 10 to 12 illustrate a further embodiment of a system 300 for transporting a moving element 208 in which the system 300 is positioned between a first track 304 and a second track 306 that are parallel. As illustrated in FIGS. 10 and 11, the system is configured to strip the moving element 308 off the first track 304 and place it onto the second track 306 but could also move moving elements from the second track 306 to the first track 304, or the like. FIG. 12 illustrates that a moving element 306 could also be allowed to move straight through on the first track 304 by appropriate positioning of the couplers of the system.

Figure 13:
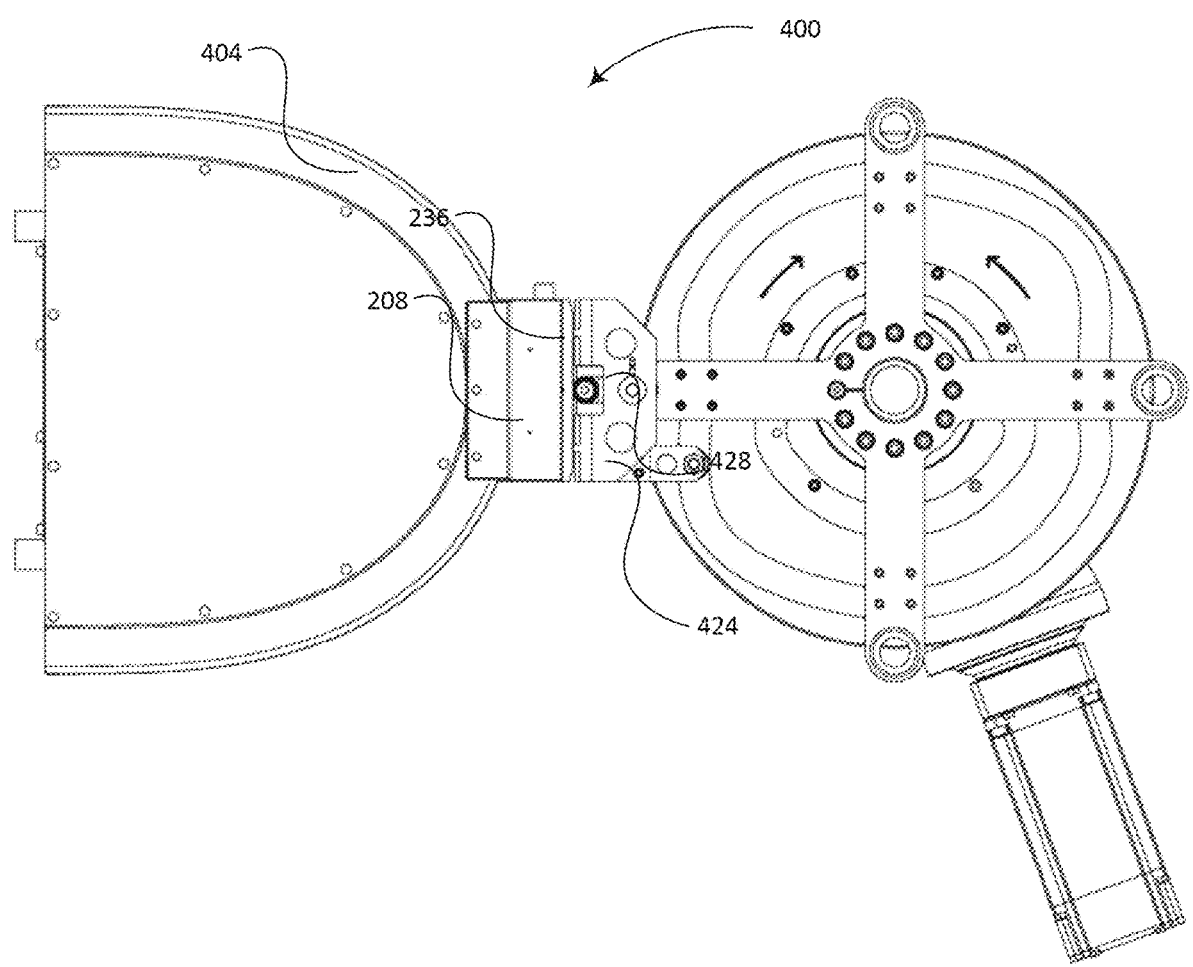
FIG. 13 illustrates another view of the system of FIG. 12.
Figure 14:
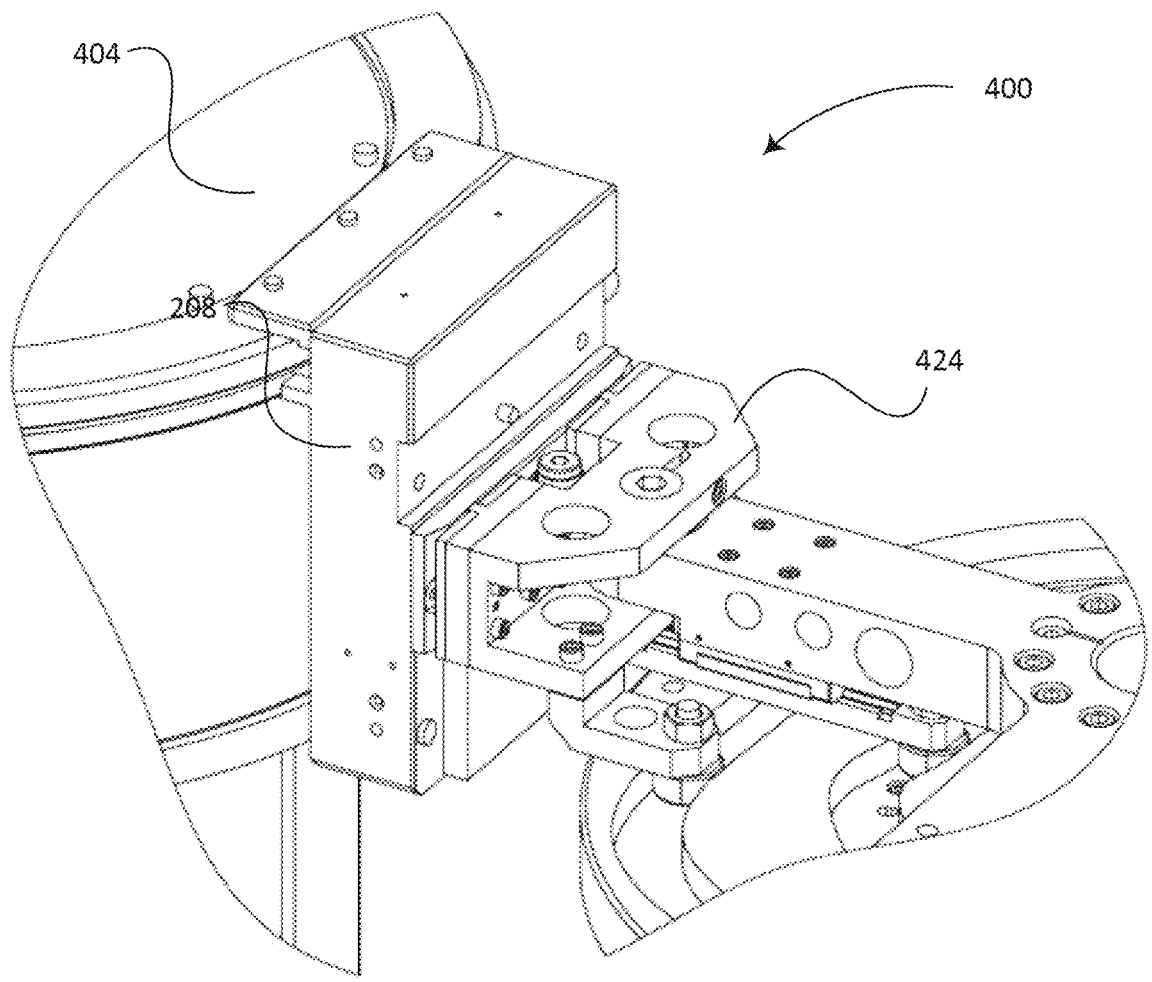
FIG. 14 illustrates another view of the system of FIG. 12.
Figure 15:
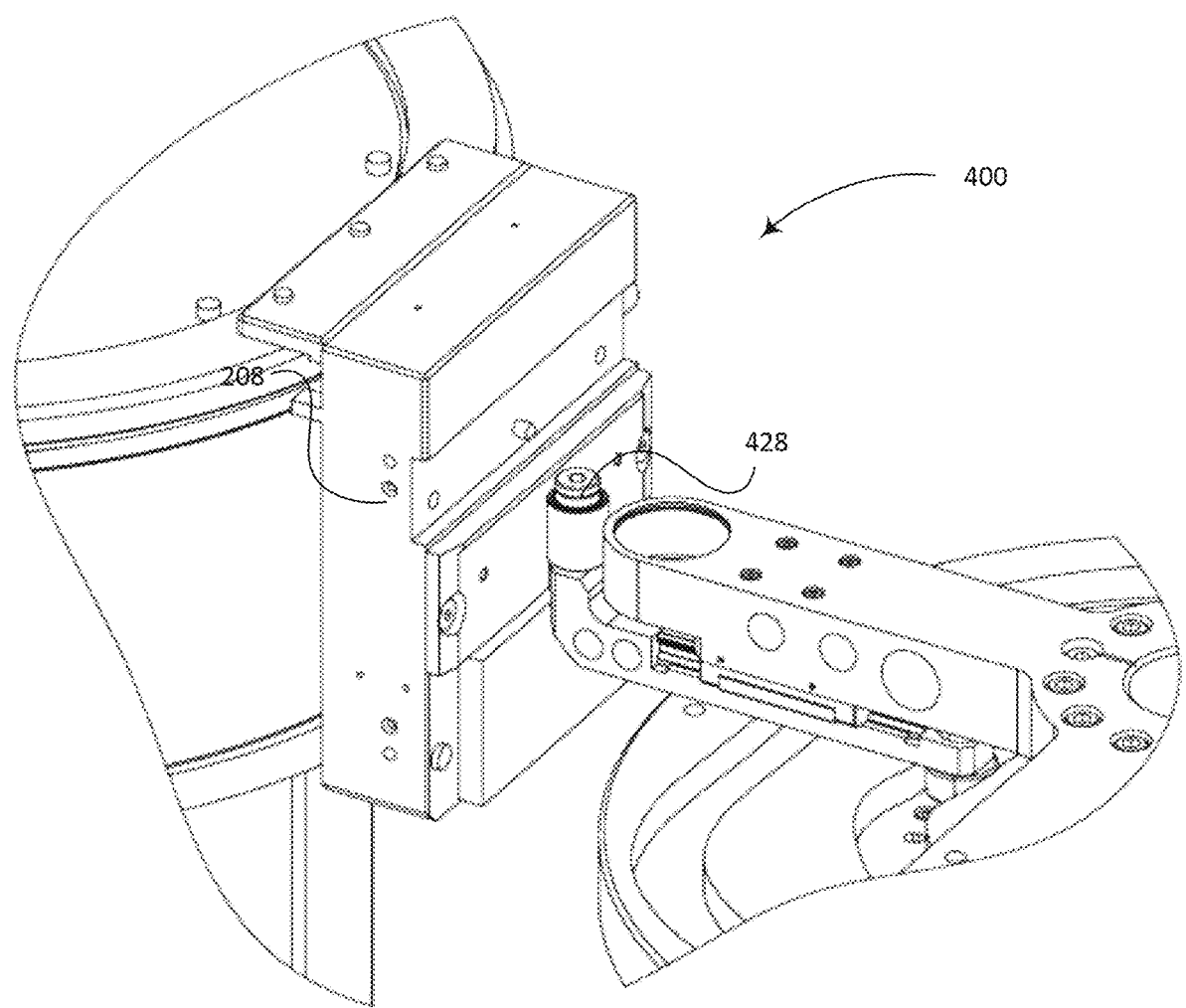
FIG. 15 illustrates another view of the system of FIG. 12.

FIGS. 13 to 15 illustrate a further embodiment of a system 400 for transporting the moving element 208 in which the system is positioned on a curved track section 404. FIG. 13 is a top view illustrating that the system can be used to strip moving elements 208 from a curved track. FIG. 14 is a perspective view showing the connection between a coupling head 424 and the moving element 208. FIG. 15 is a perspective view similar to that in FIG. 14 but with the coupling head 424 removed to show a roller head 428 in contact with the steel plate 236 on the moving element 208. In this embodiment, the system 400 may be used to strip moving elements 208 for storage or maintenance or, as in the other embodiments, to place the moving element 208 onto another track (not shown).

Figure 16:
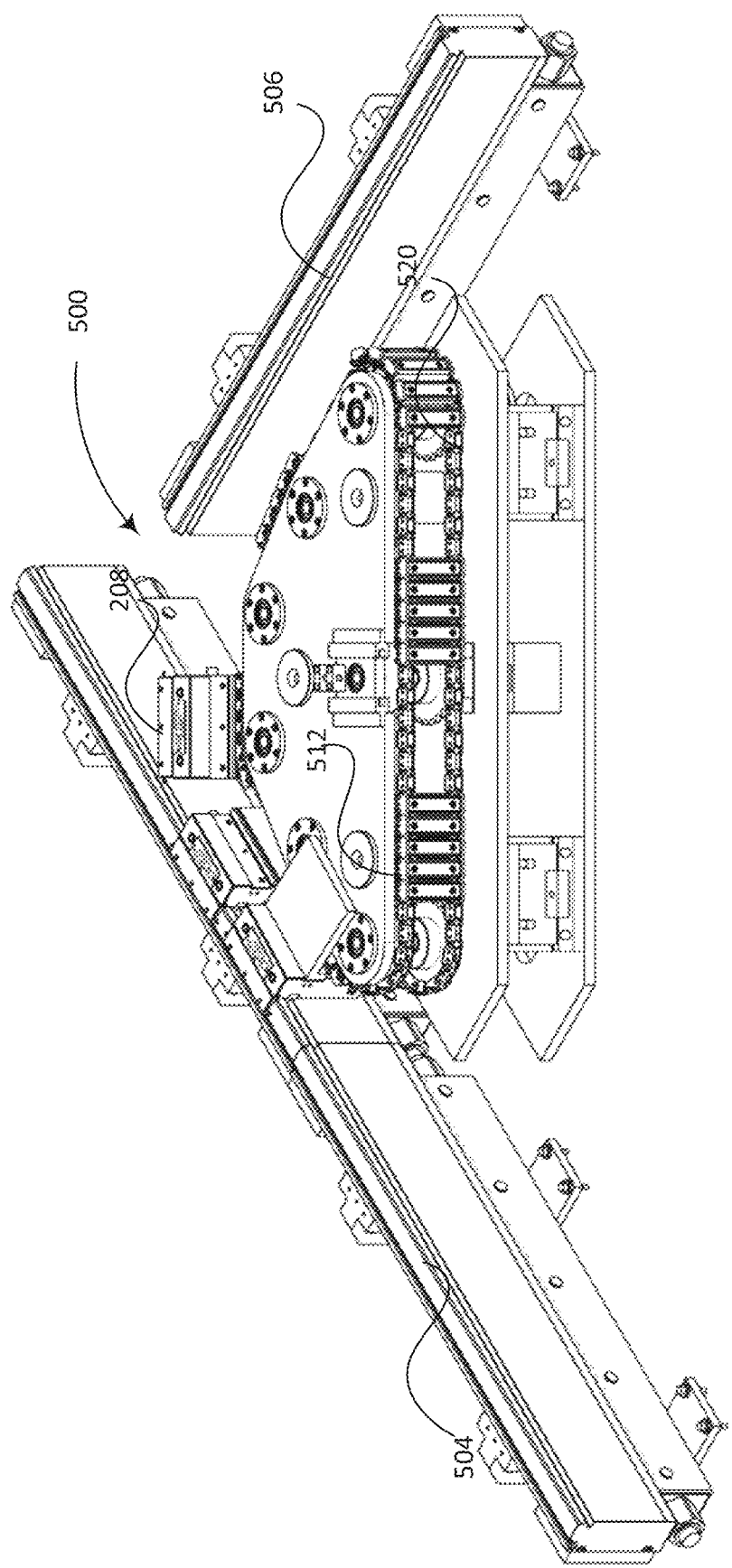
FIG. 16 illustrates another embodiment of a system for splitting and placing a moving element on a linear motor conveyor system.
Figure 17:
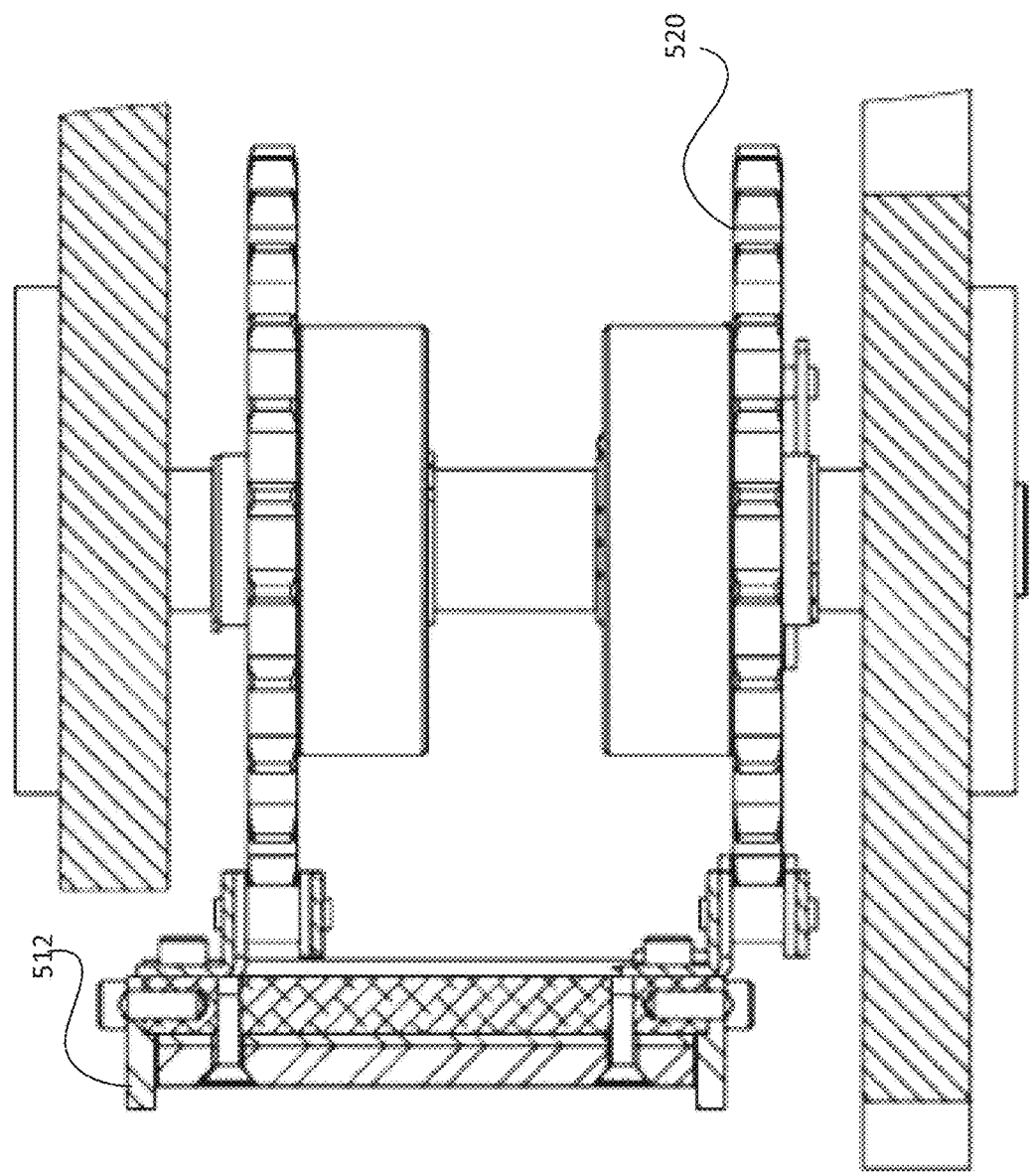
FIG. 17 illustrates a sectional view of a chain track of the system of FIG. 16.
Figure 18:
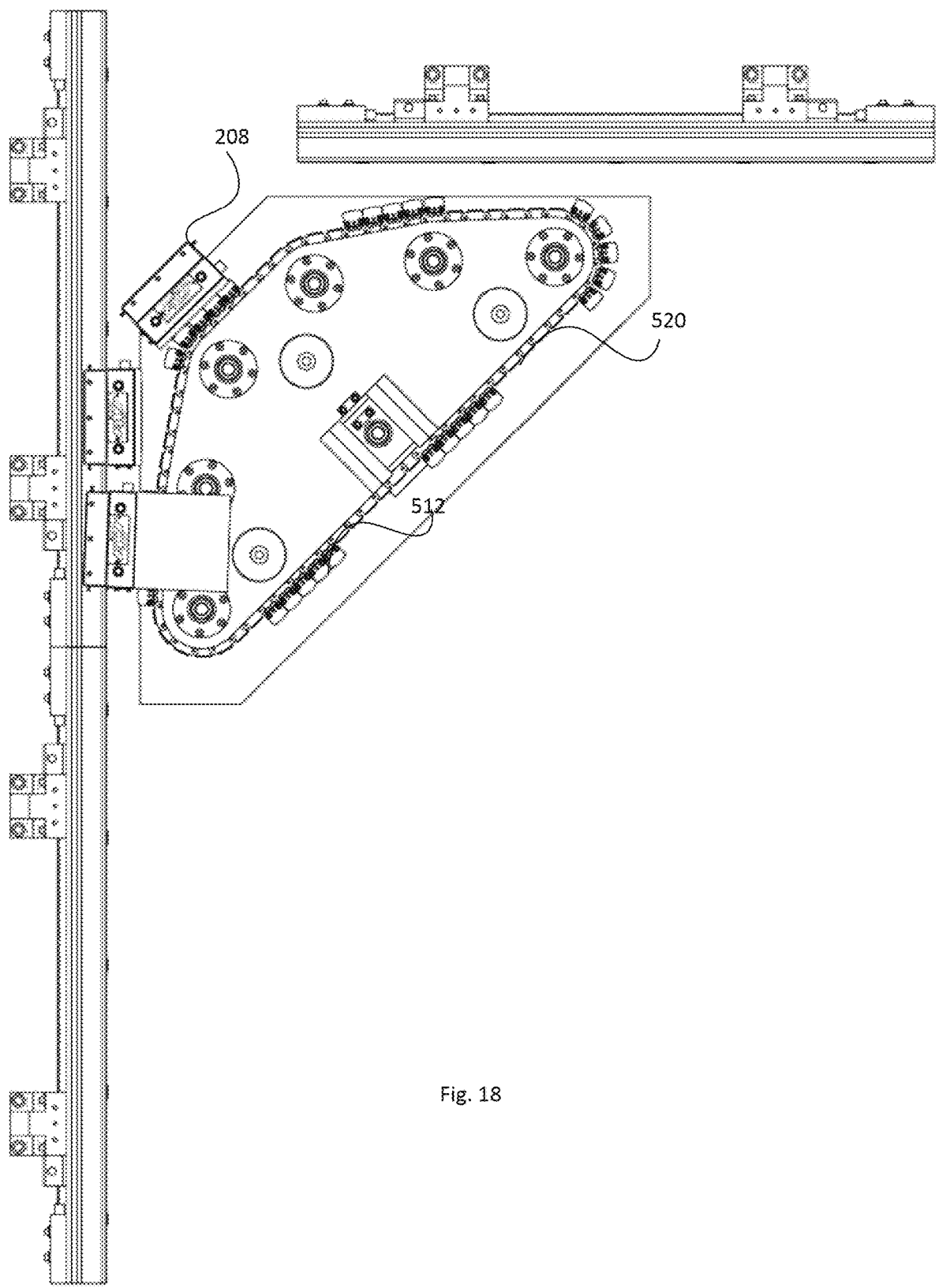
FIG. 18 illustrates another view of the system of FIG. 16.

FIGS. 16 to 18 illustrate a further embodiment of a system 500 for transporting a moving element 208. FIG. 16 is a perspective view illustrating the system 500 positioned between two perpendicular tracks, a first track 504 and a second track 506. The system 500 includes a rotatable element 502, in this case a chain track 520, which is configured to move in a rotary manner around a central body. The chain track 520 is driven by, for example, a servo motor or the like. The chain track includes one or more couplers 512 spaced on the chain track, which are configured to couple with a moving element 208 on the track. The central body may be shaped such that an edge facing the first track 504 have a straight section along which the coupler 512 makes contact with the moving element 208 and a tapered section during which the coupler strips the moving element off of the track. The edge of the central body facing the second track 506 has a tapered edge angled toward the second track 506 that brings the moving element in range of the second track and a straighter section during which the moving element 208 is placed on the second track 506. As with the embodiment of FIG. 4, there may be a gap between the couplers on the chain track 520 such that a moving element can proceed on the first track 504 without contact with the couplers 512 even when the chain track 520 is moving.

FIG. 17 is a side section view showing the central body, the chain track 520 and the coupler 512 of FIG. 16. The chain track 520 is driven/supported by gears or the like driven by the servo motor.

FIG. 18 is a top view of the embodiment of FIG. 16 illustrating an example shape of the central body and the movement of the moving elements 208 on the chain track 520.

Figure 19:
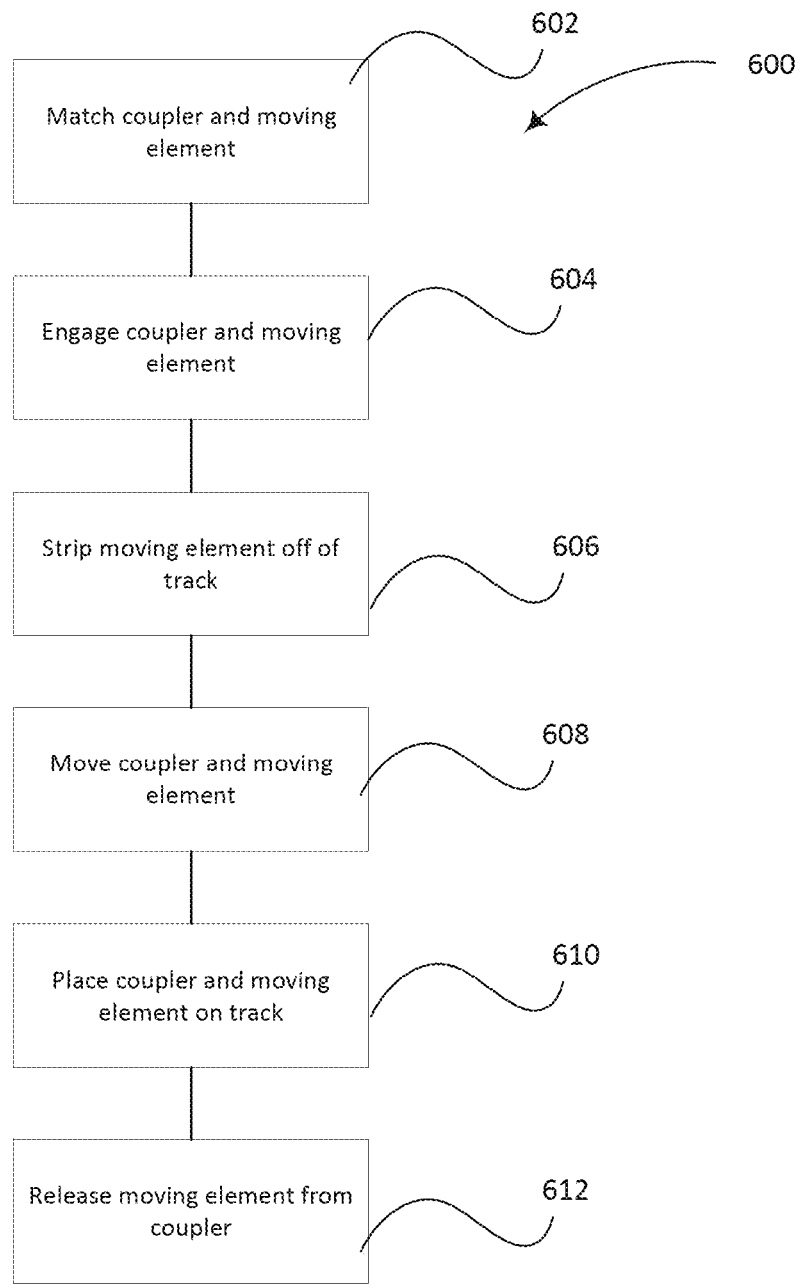
FIG. 19 illustrates a flow chart of an embodiment of a method for transporting a moving element.

FIG. 19 illustrates a flow chart of an embodiment of a method 600 for transporting a moving element. As the moving element 208 travels along a first track section, a coupler is matched to the moving element 208, at 602. At 604 the coupler is configured to engage the moving element 208, for example, via magnets located on the coupler. At 606, the coupler pries or strips the moving element 208 from the first track section. The system is configured to move the coupler and removable attached moving element 208, at 608. In some cases, the system may rotate the moving element from a first track to a second track via, for example, a chain track or a rotary wheel. At 610, the coupler is configured to place the moving element onto a second track section. The coupler releases the moving element at, 612, and the moving element may travel via the second track section after being released.

Embodiments of the system and method are intended to provide for options and alternative paths and directions for a moving element on a conveyor system. In particular, due to the use of a fairly straight-forward, cam-driven system and servo motor, a moving element may move through an inner curve on the fly and with repeatability over a large number of repetitions. The system and method also provide further options for transporting a moving element from various tracks to various other tracks in different orientations.

In the embodiments disclosed herein, the first track section and the second track section may be linear motor driven, may be servo-motor driven, or the like. In some cases, the first and second track section may each be driven by a different motor type.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. Further, it will be understood that various elements/aspects of each embodiment described herein may be used with other embodiments as appropriate and that each embodiment may include a sub-set of the elements/aspects described therewith.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor/controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Applicants reserve the right to pursue any embodiments or sub-embodiments or combinations thereof disclosed in this application; to claim any part, portion, element and/or combination thereof, including the right to disclaim any part, portion, element and/or combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A transporting system for a linear motor conveyor system, wherein the conveyor system comprises at least one moving element and at least one track on which the moving element moves, the transporting system comprising:
   a rotatable element;
   a motor for rotating the rotatable element;
   a coupler connected to the rotatable element, wherein the coupler is configured to engage with the moving element by a magnetic coupling system when the coupler is positioned in a predetermined relationship with the moving element; and
   a controller configured to:
      operatively connect with the linear motor conveyor system; and
      control at least one of the moving element and the rotatable element so that the coupler is positioned in the predetermined relationship with the moving element on the track such that the coupler removes the moving element from the track.

2. A transporting system according to claim 1, wherein the at least one track of the linear motor conveyor system comprises a first track and a second track that is different from the first track, the moving element is on the first track, and the controller is further configured to, after removing the moving element from the first track, move the rotatable element and coupler to place the moving element on the second track and disengage the coupler to release the moving element onto the second track.

3. A transporting system according to claim 2, wherein the coupler is configured to engage with the moving element and to disengage the moving element by a cam system in communication with the coupler.

4. A transporting system according to claim 3, wherein the cam system is configured to push the moving element off the coupler in order to disengage the moving element.

5. A transporting system according to claim 1, wherein the motor is a servo motor.

6. A transporting system according to claim 1, wherein the system comprises a plurality of couplers and the plurality of couplers are spaced such that, as the rotatable element rotates, the moving element may pass between couplers while moving on the track.

7. A transporting system for a linear motor conveyor system, wherein the conveyor system comprises at least one moving element and a first track and a second track, which is different from the first track, on which the moving element moves, the transporting system comprising:
   a rotatable element;
   a motor for rotating the rotatable element;
   a coupler connected to the rotatable element, wherein the coupler includes a coupler head configured to engage with the moving element by a magnetic coupling system when the coupler is positioned in a predetermined relationship with the moving element;
   a controller configured to:
      operatively connect with the linear motor conveyor system;
      control at least one of the moving element and the rotatable element so that the coupler is positioned in the predetermined relationship with the moving element on the first track such that the coupler removes the moving element from the first track; and
      control at least one of the rotatable element and the second track to place the moving element on the second track and disengage the coupler head to release the moving element onto the second track.

8. A transporting system according to claim 7, further comprising a cam system that adjusts the coupler head to assist the coupler head to engage with the moving element and to disengage the moving element and wherein the cam system comprises a roller that can be moved to push the moving element off of the coupler head.

9. A transporting system according to claim 7, wherein the motor is a servo motor.

10. A transporting system according to claim 7, wherein the system comprises a plurality of couplers and the plurality of couplers are spaced such that, as the rotatable element rotates, the moving element may pass between couplers while moving on the track.

11. A transporting method for a linear motor conveyor system, wherein the conveyor system comprises at least one moving element and a first track and a second track that is different from the first track on which the moving element moves, the transporting method comprising:
   moving a coupler to match with the moving element on the first track;
   engaging the coupler with the moving element by bringing a magnet in proximity to the moving element;
   stripping the moving element off the first track by prying the moving element off the first track via a magnetic force of the magnet;
   moving the coupler and moving element to a second track;
   placing the moving element on the second track; and
   releasing the moving element from the coupler.

12. A transporting method according to claim 11, wherein the releasing comprises pushing the moving element off of the magnet.

* * * * *